United States Patent
Uno et al.

(10) Patent No.: US 11,258,392 B2
(45) Date of Patent: Feb. 22, 2022

(54) ELECTRONIC CIRCUITRY FOR CONVERTING DC VOLTAGE TO AC VOLTAGE

(71) Applicant: KABUSHIKI KAISHA TOSHIBA, Tokyo (JP)

(72) Inventors: Hiroshi Uno, Kawasaki Kanagawa (JP); Masatoshi Suzuki, Susono Shizuoka (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/010,859

(22) Filed: Sep. 3, 2020

(65) Prior Publication Data

US 2021/0184615 A1   Jun. 17, 2021

(30) Foreign Application Priority Data

Dec. 17, 2019 (JP) .............................. JP2019-227439

(51) Int. Cl.
| | |
|---|---|
| *H02P 27/08* | (2006.01) |
| *H02M 7/538* | (2007.01) |
| *H02M 7/5387* | (2007.01) |
| *H02M 7/49* | (2007.01) |

(52) U.S. Cl.
CPC .............. *H02P 27/08* (2013.01); *H02M 7/49* (2013.01); *H02M 7/5387* (2013.01)

(58) Field of Classification Search
CPC ...... H02M 1/088; H02M 7/4815; H02M 7/49; H02M 7/4931; H02M 7/5387; H02M 7/53871; H02P 27/08
See application file for complete search history.

(56) References Cited

U.S. PATENT DOCUMENTS

| | | | | |
|---|---|---|---|---|
| 6,232,946 | B1* | 5/2001 | Brownlow | G09G 3/3688 |
| | | | | 345/98 |
| 10,333,428 | B2* | 6/2019 | Kondo | H02M 7/5387 |
| 10,831,225 | B2* | 11/2020 | Araragi | H02M 1/08 |
| 2003/0179595 | A1* | 9/2003 | Kleveland | H02M 7/493 |
| | | | | 363/132 |

(Continued)

FOREIGN PATENT DOCUMENTS

| | | |
|---|---|---|
| JP | 3375255 B2 | 2/2003 |
| JP | 6079861 B1 | 2/2017 |

*Primary Examiner* — Yusef A Ahmed
(74) *Attorney, Agent, or Firm* — Finnegan, Henderson, Farabow, Garrett & Dunner L.L.P.

(57) ABSTRACT

According to one embodiment, an electronic circuitry that converts DC voltage into AC voltage includes first to fourth switching circuitries. A cycle includes first and second periods. During the first period, the first and second switching circuitries are turned on, and the third and fourth switching circuitries are turned off, and during the second period, the first switching and second circuitries are turned off, and the third and fourth switching circuitries are turned on. At least one of the first to fourth switching circuitries includes a first switching element and a second switching element in parallel. During a time period during which at least one of the first to fourth switching circuitries is turned on, the first switching element is turned on during a first subperiod, and the second switching element is turned on during a second subperiod that overlaps the first subperiod.

11 Claims, 16 Drawing Sheets

(56) References Cited

U.S. PATENT DOCUMENTS

| | | | | |
|---|---|---|---|---|
| 2007/0001633 A1* | 1/2007 | Su | .................. | H02P 6/10 |
| | | | | 318/822 |
| 2009/0303358 A1* | 12/2009 | Kawahito | ............ | H04N 5/3575 |
| | | | | 348/255 |
| 2011/0266992 A1* | 11/2011 | Nishiguchi | ............. | H02P 27/08 |
| | | | | 318/807 |
| 2013/0039100 A1* | 2/2013 | Kazama | ............... | H03K 17/164 |
| | | | | 363/41 |
| 2016/0105119 A1* | 4/2016 | Akamatsu | ......... | H02M 3/33546 |
| | | | | 363/21.04 |
| 2016/0191021 A1* | 6/2016 | Zhao | ..................... | H03K 17/56 |
| | | | | 327/109 |
| 2016/0191046 A1* | 6/2016 | Zhao | ................... | H03K 17/127 |
| | | | | 327/432 |
| 2017/0054377 A1* | 2/2017 | Mrusek | ................... | H02M 7/48 |
| 2017/0133920 A1* | 5/2017 | Kondo | ................. | H02M 1/088 |
| 2017/0302152 A1* | 10/2017 | Watanabe | ............ | H02M 1/088 |
| 2018/0342961 A1* | 11/2018 | Hamerski | ............. | H02M 7/219 |
| 2018/0375442 A1* | 12/2018 | Kondo | ................. | H05B 6/101 |
| 2020/0358366 A1* | 11/2020 | Onaka | .................... | H02M 3/28 |
| 2021/0013825 A1* | 1/2021 | Lee | ...................... | H02M 5/458 |

\* cited by examiner

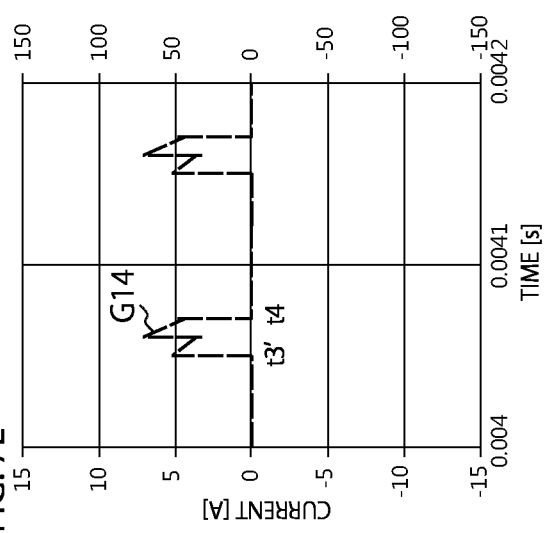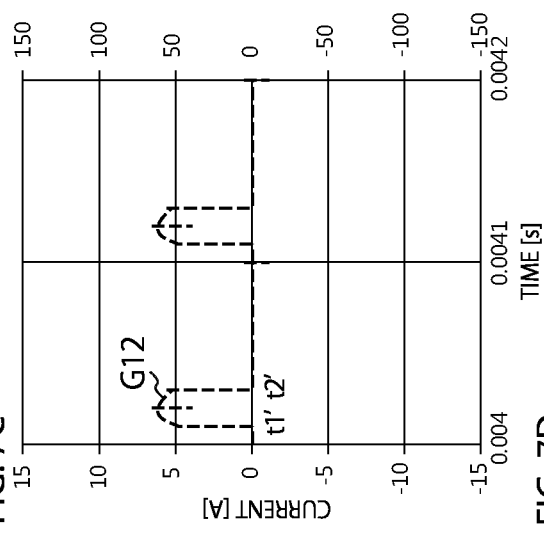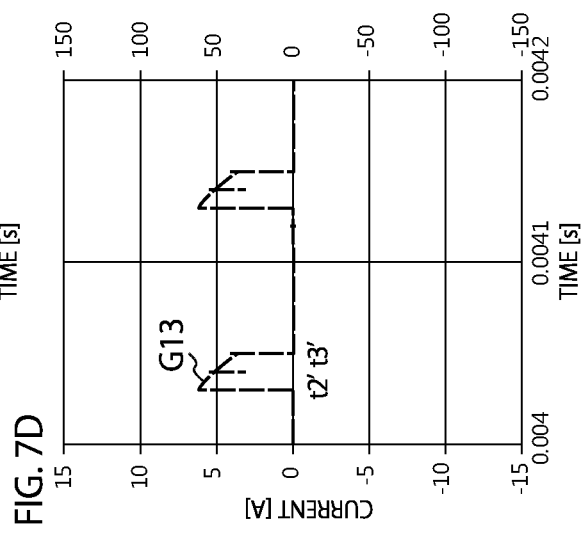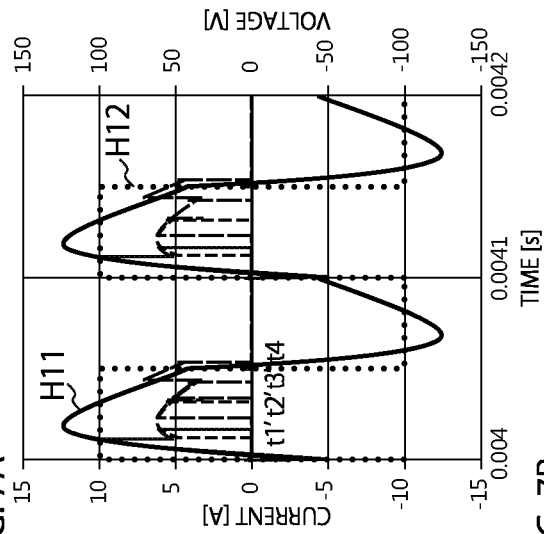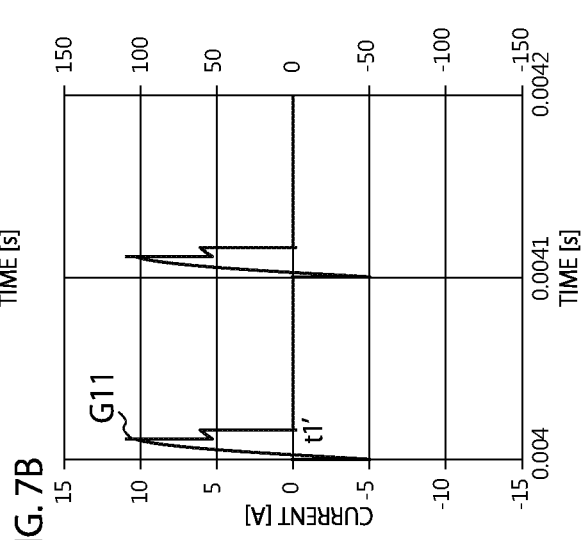

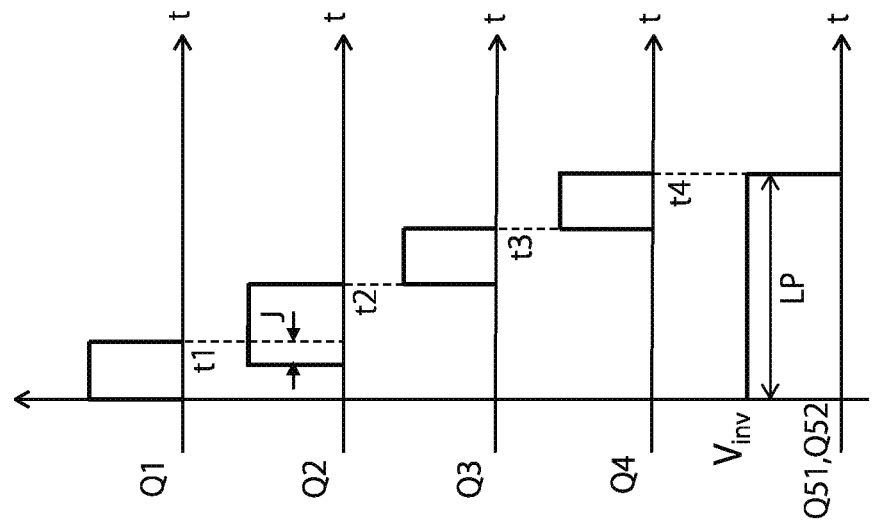
FIG. 15B SECOND CYCLE
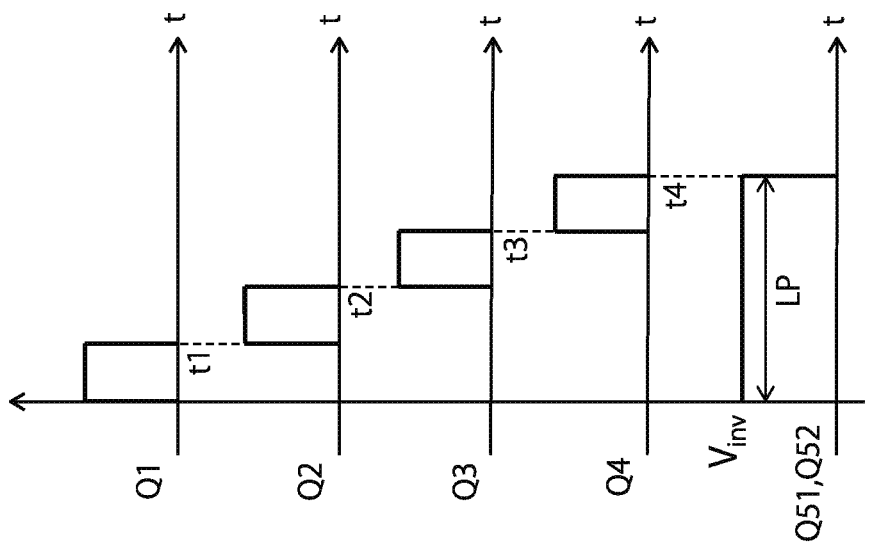
FIG. 15A FIRST CYCLE

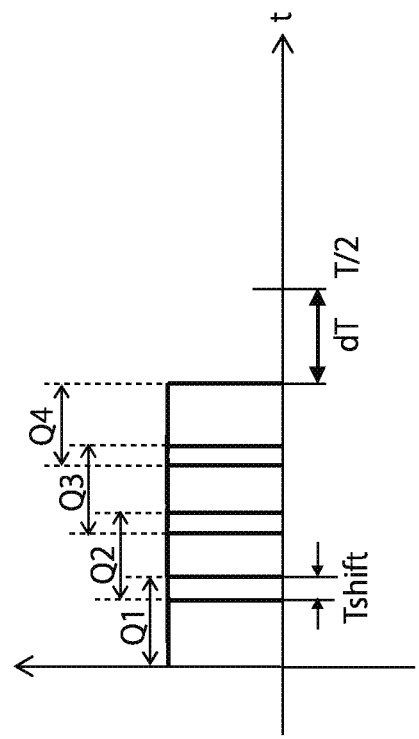
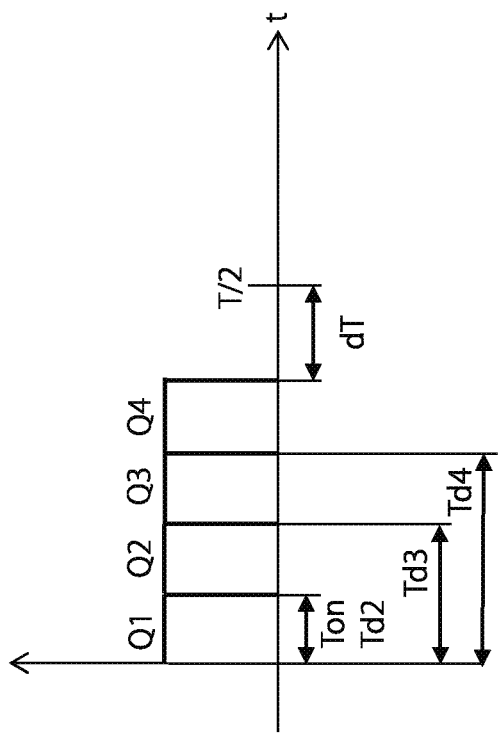
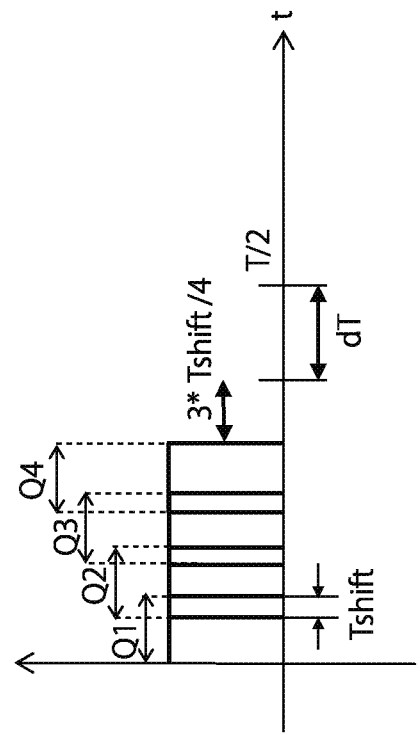
FIG. 16A
FIG. 16B
FIG. 16C

ELECTRONIC CIRCUITRY FOR CONVERTING DC VOLTAGE TO AC VOLTAGE

CROSS REFERENCE TO RELATED APPLICATIONS

This application is based upon and claims the benefit of priority from the prior Japanese Patent Application No. 2019-227439, filed on Dec. 17, 2019, the entire contents of which are incorporated herein by reference.

FIELD

Embodiments described herein relate to an electronic circuitry.

BACKGROUND

A known inverter circuit for a resonant load has a configuration including four arms each formed of N series-connected switching element assemblies that are connected together in parallel and each of which includes M switching elements connected in series. When timings with which the switching elements are turned on are controlled in a time-sharing manner, a switching frequency of each switching element can be decreased to a frequency proportional to a value of M×N. This enables the switching elements to reduce their losses (switching losses, etc.).

This configuration, however, results in high costs because the configuration includes a greatly increased number of switching elements when compared with a full-bridge inverter circuit, in which each arm includes one switching element. In addition, if a malfunction occurs in any switching element included in one of the series-connected assemblies of an arm, the arm cannot operate normally. As a result, the inverter circuit cannot operate normally.

BRIEF DESCRIPTION OF THE DRAWINGS

FIGS. 7A to 7E each is a diagram illustrating an example of a simulation result;

FIGS. 15A and 15B each is a timing chart illustrating an example of changing a time length for which a switching element is driving; and FIGS. 16A to 16C each is a diagram for describing a principle of the present embodiment.

DETAILED DESCRIPTION

According to an embodiment, an electronic circuitry is configured to convert DC voltage specified by a difference between a first voltage and a second voltage into AC voltage and to supply the AC voltage to a first terminal and a second terminal between which a load circuit is to be connected.

The electronic circuitry includes first switching circuitry, second switching circuitry, third switching circuitry and fourth switching circuitry.

The first switching circuitry is coupled to the first voltage and the first terminal and configured to be turned on during at least part of a first period in a cycle and configured to be turned off during at least part of a second period in the cycle.

The second switching circuitry is coupled to the second voltage and the second terminal and configured to be turned on during at least part of the first period in the cycle and configured to be turned off during at least part of the second period in the cycle.

The third switching circuitry is coupled to the first voltage and the second terminal and configured to be turned off during at least part of the first period in the cycle and configured to be turned on during at least part of the second period in the cycle.

The fourth switching circuitry is coupled to the second voltage and the first terminal and configured to be turned off during at least part of the first period in the cycle and configured to be turned on during at least part of the second period in the cycle.

At least one of the first switching circuitry to the fourth switching circuitry includes a first switching element and a second switching element in parallel.

During a time period during which the at least one of the first switching circuitry to the fourth switching circuitry is turned on, the first switching element is turned on during a first subperiod, and the second switching element is turned on during a second subperiod, wherein the first subperiod and the second subperiod partially overlaps with each other.

Below, embodiments of the present invention will be described with reference to the drawings.

First Embodiment

Figure 1:
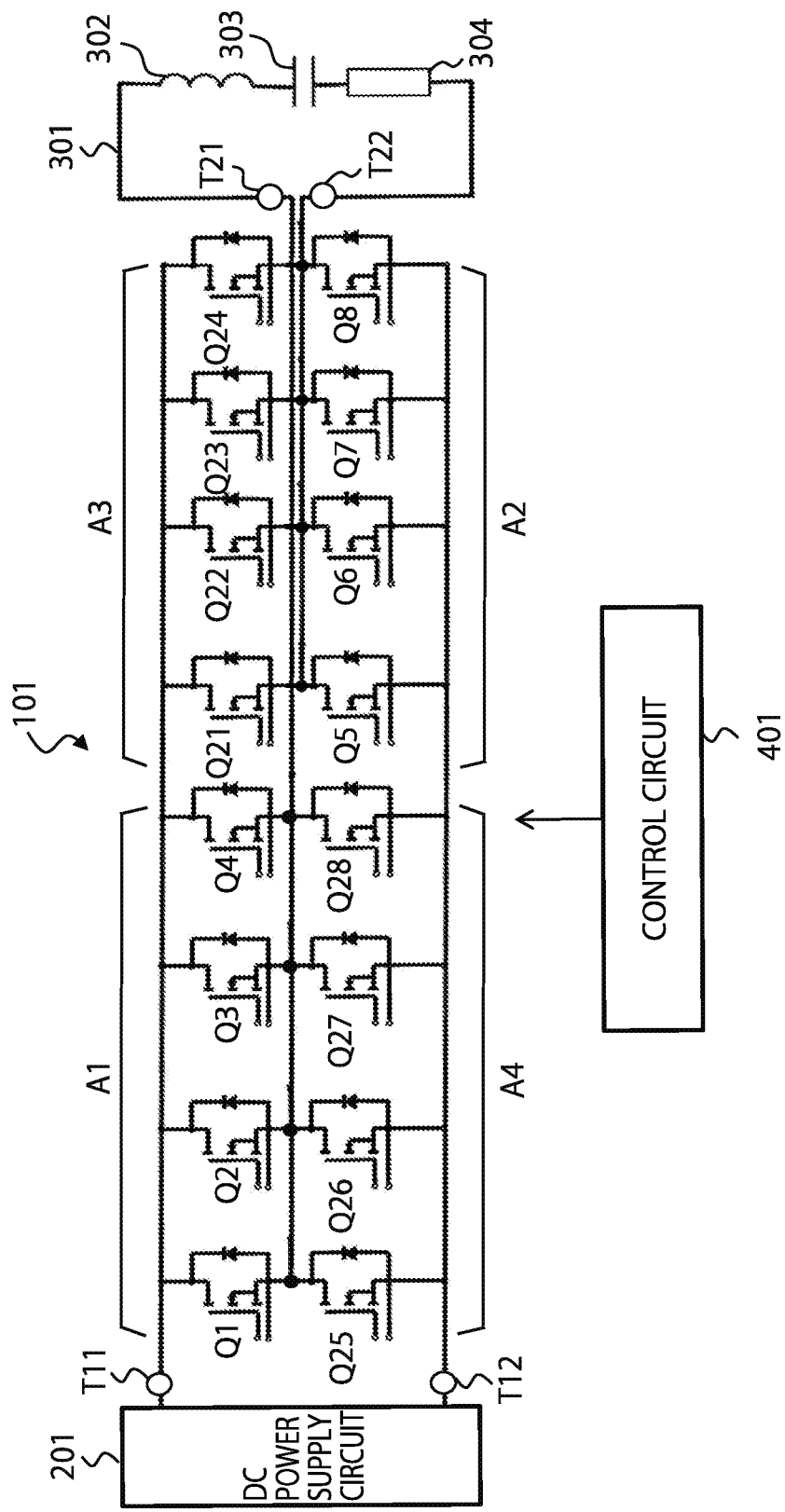
FIG. 1 is a diagram illustrating a general configuration of an electric power system according to a first embodiment.

FIG. 1 illustrates a general configuration of an electric power system according to a first embodiment. The electric power system illustrated in FIG. 1 includes an inverter 101, a DC power supply 201, a load circuit 301 (or load circuitry), and a control circuit 401. This electric power system is one that uses the inverter 101 to converts a DC voltage generated by the DC power supply 201 into an AC voltage and supplies the AC voltage to the load circuit 301. The control circuit 401 controls a plurality of switching elements included in the inverter 101.

The DC power supply 201 includes a positive power supply terminal T11 that provides a first voltage and a negative power supply terminal T12 that provides a second voltage. The DC power supply 201 generates the DC voltage and supplies the generated DC voltage via the positive power supply terminal T11 and the negative power supply terminal T12 to the inverter 101. As an example, the DC power supply 201 includes an AC power supply that supplies an AC power (AC voltage and AC current) having a constant frequency and an AC/DC converter that converts the voltage of the AC power into the DC voltage. Examples of the AC power supply include commercial power. The commercial power has, for example, a frequency of 50 Hz or 60 Hz and outputs an AC voltage of single-phase 100 V or three-phase 200 V. The AC/DC converter is connected to the AC power supply via a wire (cable, etc.) and converts voltage of the AC power supplied from the AC power supply into the DC voltage. The converted DC voltage is supplied to the inverter 101.

The DC power supply 201 may include a DC/DC converter that converts (steps up or down) the DC voltage generated by the AC/DC converter into another DC voltage. In this configuration, the DC voltage converted by the DC/DC converter is supplied to the inverter 101.

These configurations do not limit the configuration of the DC power supply 201. For example, the DC power supply 201 may be a primary or secondary battery. In this configuration, the battery may supply a DC voltage directly to the inverter 101. Alternatively, the DC voltage output from the battery may undergo DC/DC conversion before supplied to the inverter 101.

The load circuit 301 is a resonant load having a predetermined resonance frequency. The load circuit 301 includes a positive input terminal T21 (first terminal) and a negative input terminal T22 (second terminal) that receive the AC voltage from the inverter 101. The load circuit 301 includes a coil 302 being an inductive element, a capacitor 303 being a capacitive element, and a resistor 304. The coil 302, the capacitor 303, and the resistor 304 are connected together in series to form a resonance circuit. The resonance circuit has a resonance frequency that is the same or substantially the same as a frequency of the AC voltage supplied from the inverter 101. This makes the load circuit 301 operate efficiently. As long as the load circuit 301 includes at least one coil 302, at least one of the resistor 304 and the capacitor 303 need not be included. As long as the load circuit 302 includes at least one coil 302, an element in addition to the resistor 304 and the capacitor 303 may be included.

A specific example of the load circuit 301 includes a circuit for driving a motor or a power transmission resonator of a power transmission device of a wireless power transmission system. In a case where the load circuit 301 is the power transmission resonator, the coil 302 is a counterpart of a coil for power transmission. That is, a magnetic field is generated by the coil 302 in response to the AC voltage supplied from the inverter 101 and then coupled to a coil of a power reception resonator. This causes electric power to be wirelessly transmitted from a power transmission device to a power reception device. Examples of the wireless power transmission include a wireless power transmission in an 85 kHz band. Other specific examples of the load circuit 301 include an induction cooker, a synchronous rectifier, and the like.

The inverter 101 converts the DC voltage supplied from the positive power supply terminal T11 and the negative power supply terminal T12 of the DC power supply 201 into the AC voltage and supplies the AC voltage to the positive input terminal T21 and the negative input terminal T22 of the load circuit 301.

The inverter 101 includes an arm A1, an arm A2, an arm A3, and an arm A4. The arm A1 is coupled between the positive power supply terminal T11 at the first voltage and the positive input terminal T21. The arm A2 is coupled between the negative power supply terminal T12 at the second voltage and the negative input terminal T22. The arm A3 is coupled between the positive power supply terminal T11 at the first voltage and the negative input terminal T22. The arm A4 is coupled between the negative power supply terminal T12 at the second voltage and the positive input terminal T21. As an example, the arm A1 corresponds to first switching circuitry, the arm A2 corresponds to second switching circuitry, the arm A3 corresponds to third switching circuitry, and the arm A4 corresponds to fourth switching circuitry.

The arm A1 includes at least two switching elements (e.g., corresponding to first and second switching elements) connected together in parallel. In the example illustrated in FIG. 1, the arm A1 includes four switching elements Q1, Q2, Q3, and Q4. The switching elements Q1, Q2, Q3, and Q4 are each in reverse connection with a freewheeling diode. The reverse connection means that current flows through the freewheeling diode in a direction opposite to that of current flowing through each of the switching elements Q1, Q2, Q3, and Q4. The freewheeling diode prevents current from flowing into the switching elements Q1, Q2, Q3, and Q4 in the opposite direction. At least one or all of the switching elements Q1, Q2, Q3, and Q4 may have a configuration without a freewheeling diode.

As an example, the switching elements Q1 to Q4 are N-channel MOS transistors. Note that the switching elements Q1 to Q4 may be P-channel MOS transistors or may be elements other than the MOS transistors, such as bipolar transistors. Specific examples of the switching elements similarly apply to switching element Q5 to 8 and Q21 to Q28 of the other arms A2 to A4 described below.

The switching elements Q1 to Q4 each include a drain terminal that is coupled to the positive power supply terminal T11 of the DC power supply 201. The switching elements Q1 to Q4 each include a source terminal that is coupled to the positive input terminal T21 of the load circuit 301. The switching elements Q1 to Q4 each include a gate terminal that is connected to the control circuit 401.

The arm A2 includes at least two switching elements (e.g., corresponding to first and second switching elements) connected together in parallel. In the example illustrated in FIG. 1, the arm A2 includes four switching elements Q5, Q6, Q7, and Q8. The switching elements Q5, Q6, Q7, and Q8 are each in reverse connection with a freewheeling diode. At least one or all of the switching elements Q5, Q6, Q7, and Q8 may have a configuration without a freewheeling diode.

The switching elements Q5 to Q8 each include a drain terminal that is coupled to the negative input terminal T22 of the load circuit 301. The switching elements Q5 to Q8 each include a source terminal that is coupled to the negative power supply terminal T12 of the DC power supply 201. The switching elements Q5 to Q8 each include a gate terminal that is connected to the control circuit 401.

The arm A3 includes at least two switching elements (e.g., corresponding to first and second switching elements) connected together in parallel. In the example illustrated in FIG. 1, the arm A3 includes four switching elements Q21, Q22, Q23, and Q24. The switching elements Q21, Q22, Q23, and Q24 are each in reverse connection with a freewheeling diode. At least one or all of the switching elements Q21, Q22, Q23, and Q24 may have a configuration without a freewheeling diode.

The switching elements Q21 to Q24 each include a drain terminal that is coupled to the positive power supply terminal T11 of the DC power supply 201. The switching elements Q21 to Q24 each include a source terminal that is coupled to the negative input terminal T22 of the load circuit 301. The switching elements Q21 to Q24 each include a gate terminal that is connected to the control circuit 401.

The arm A4 includes at least two switching elements (e.g., corresponding to first and second switching elements) connected together in parallel. In the example illustrated in FIG. 1, the arm A4 includes four switching elements Q25, Q26, Q27, and Q28. The switching elements Q25, Q26, Q27, and Q28 are each in reverse connection with a freewheeling diode. At least one or all of the switching elements Q25, Q26, Q27, and Q28 may have a configuration without a freewheeling diode.

The switching elements Q25 to Q28 each include a drain terminal that is coupled to the positive input terminal T21 of the load circuit 301. The switching elements Q25 to Q28 each include a source terminal that is coupled to the negative power supply terminal T12 of the DC power supply 201. The switching elements Q25 to Q28 each include a gate terminal that is connected to the control circuit 401.

The switching elements Q1 to Q8 and Q21 to Q28 are turned on by application of a first gate voltage (ON signal), which has a value not less than a threshold value, from the control circuit 401. The switching elements Q1 to Q8 and Q21 to Q28 are turned off by application of a second gate voltage (OFF signal), which has a value less than the threshold value, from the control circuit 401. The ON signal applied to the switching elements Q1 to Q8 and Q21 to Q28 is a control signal to turn on the switching elements Q1 to Q8 and Q21 to Q28. The OFF signal applied to the switching elements Q1 to Q8 and Q21 to Q28 is a control signal to turn off the switching elements Q1 to Q8 and Q21 to Q28.

The control circuit 401 controls the ON signal and the OFF signal to be supplied to the arms A1 to A4 (the first to fourth switching circuitries). More in detail, the control circuit 401 controls the ON signal and the OFF signal to be supplied to the switching elements Q1 to Q8 and Q21 to Q28. The control circuit 401 may be configured by a hardware circuit (analog circuit or digital circuit) or may be configured by a processor such as a CPU and software such as a program.

The control circuit 401 regards a time period that includes a first-half period (first period) and a second-half period (second period) as one cycle. As an example, the first-half period and the second-half period have the same length, which is equivalent to half of every cycle. Note that there may be a dead time described below between the first-half period and the second-half period.

On every cycle, during the first-half period, the control circuit 401 supplies a control signal to turn on the arm A1 and the arm A2 (the ON signal) and supplies a control signal to turn off the arm A3 and the arm A4 (the OFF signal). During the second-half period, the control circuit 401 supplies a control signal to turn off the arm A1 and the arm A2 (the OFF signal) and supplies a control signal to turn on the arm A3 and the arm A4 (the ON signal). The control signal to turn on the arms (switching circuitries) includes a control signal to turn on at least one of the switching elements included in each of the arms. The control signal to turn off the arms (switching circuitries) corresponds to a control signal to turn off all of the switching elements included in the arms (switching circuitries).

This causes only the arm A1 and the arm A2 to be turned on during the first-half period and causes only the arm A3 and the arm A4 to be turned on during the second-half period. As a result, during the first-half period, current (first phase current) flows in a direction passing through the positive power supply terminal T11 of the DC power supply 201, the arm 1, the load circuit 301, the arm A2, and the negative power supply terminal T12 of the DC power supply 201. During the second-half period, current (second phase current) flows in a direction passing through the positive power supply terminal T11 of the DC power supply 201, the arm 3, the negative input terminal T22 of the load circuit 301, the positive input terminal T21, the arm A4, and the negative power supply terminal T12 of the DC power supply 201. Alternation between the first-half period and the second-half period generates an AC voltage having a predetermined frequency.

As described above, there may be a dead time between the first-half period and the second-half period. The dead time is a time during which all of the arms A1 to A4 are turned off. This prevents arms having phases different from each other (e.g., the arm A1 and the arm A3) from being turned on simultaneously to cause backflow of current.

In the present embodiment, lengths of the first-half period and the second-half period are the same as lengths of a first-half period and a second-half period used by a full bridge inverter to generate an AC voltage having the same frequency as that of the present embodiment.

Figure 2:
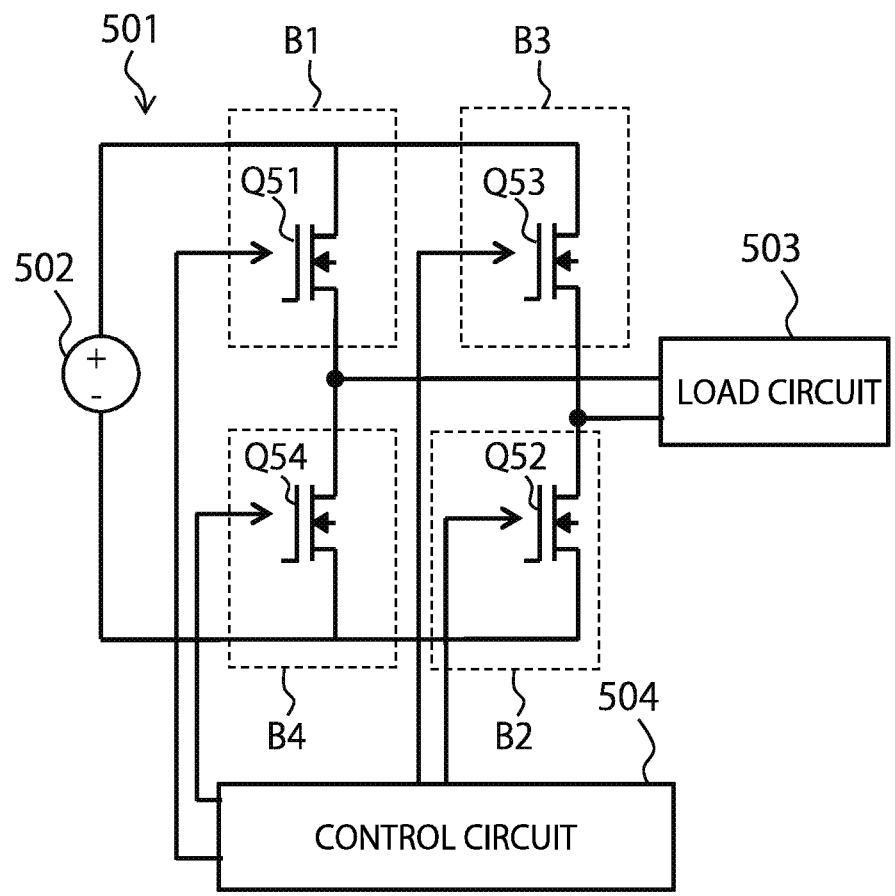
FIG. 2 is a diagram illustrating an example of an electric power system including a full bridge inverter as a comparative example.

FIG. 2 illustrates an example of an electric power system including a full bridge inverter as a comparative example. The electric power system illustrated in FIG. 2 includes a full bridge inverter 501, a DC power supply 502, a load circuit 503, and a control circuit 504. The full bridge inverter 501 includes four arms B1, B2, B3, and B4. The arms B1, B2, B3, and B4 include switching elements (MOS transistors) Q51, Q52, Q53, and Q54, respectively. FIG. 2 differs from FIG. 1 in that a number of switching elements in each arm is one, and accordingly, the control circuit operates differently. In addition, no freewheeling diodes are provided. The rest of the configuration illustrated in FIG. 2 is the same as that of FIG. 1 and will not be described. The electric power system illustrated in FIG. 2 operates in such a manner as to turn on the switching elements Q51 and Q52 and turn off the switching elements Q53 and Q54 during a first-half period of a cycle. During a second-half period of the cycle, the electric power system operates in such a manner as to turn off the switching elements Q51 and Q52 and turn on the switching elements Q53 and Q54. The first-half period and the second-half period form one cycle. The cycle is repeated to generate the AC voltage.

The inverter according to the present embodiment illustrated in FIG. 1 achieve driving the switching elements with a loss less than a case of the generation of the AC voltage having the same frequency by the full bridge inverter as the comparative example illustrated in FIG. 2.

Operation by the inverter 101 of the present embodiment will be described below in detail. In the following operation, turning on and off the switching elements is controlled by the control circuit 401.

Figure 3:
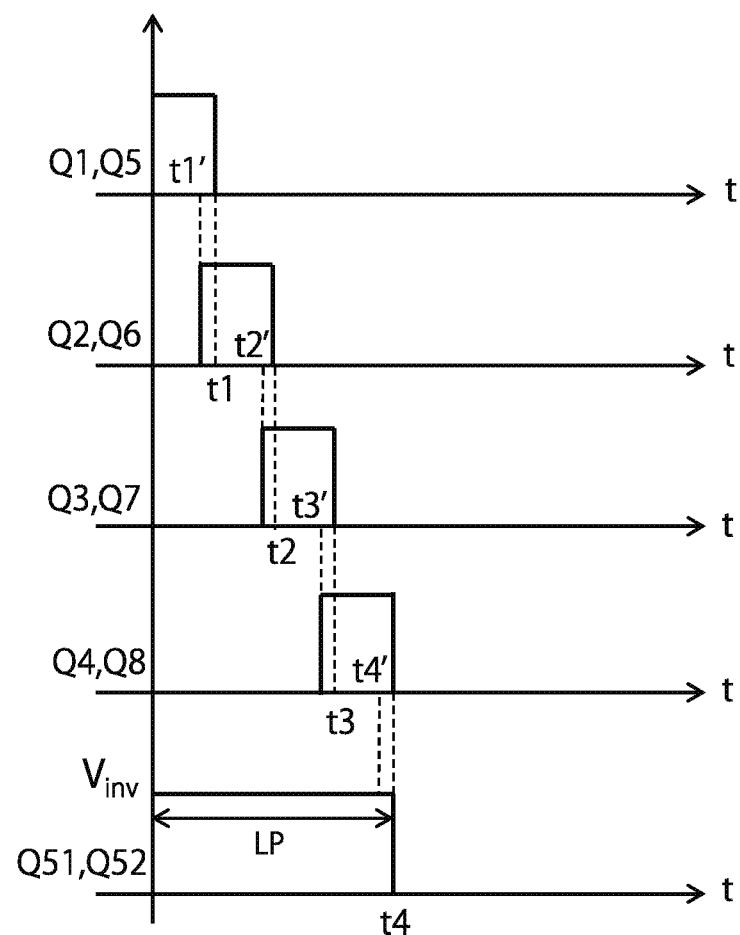
FIG. 3 is a timing chart illustrating an operation example during a first-half period.

FIG. 3 is a timing chart illustrating operation during the first-half period in detail. FIG. 3 illustrates timings for driving (timings with which the ON signal is supplied to) the switching elements Q1 to Q4 of the arm A1 and the switching elements Q5 to Q8 of the arm A2. The lowermost graph of the FIG. 3 illustrates a timing with which the full bridge inverter illustrated in FIG. 2 drives the switching element Q51 of the arm B1 and the switching element Q52 of the arm B2. In FIG. 3, the arm A1 and the arm A2 are turned on (at least one switching element included in each of the arm A1 and the arm A2 is turned on) during the first-half period. As long as the arm A1 and the arm A2 are turned on during at least part of the first-half period, there may be a time period during which neither the arm A1 nor the arm A2 are is turned on.

A pair of switching elements Q1 and Q5 (pair 1) is turned on and off simultaneously. A pair of switching elements Q2 and Q6 (pair 2) is turned on and off simultaneously. A pair of switching elements Q3 and Q7 (pair 3) is turned on and off simultaneously. A pair of switching elements Q4 and Q8 (pair 4) is turned on and off simultaneously. Note that the inverter 101 may have a configuration in which switching elements of each pair are not turned on and off simultaneously.

Let LP denote the length of the first-half period. The first-half period will be denoted as a first-half period LP. The first-half period LP is divided into four periods having the same length, and time points at every time LP/4 from its beginning are denoted as t1, t2, t3, and t4, as illustrated in FIG. 3.

First, the switching elements Q1 and Q5 (pair 1) are turned on during a subperiod from a start time point of the first-half period (here set as a time point 0) until the time point t1. That is, the switching elements Q1 and Q5 are turned on for LP/4 from the time point 0. In other words, the ON signal (control signal) is supplied to the switching elements Q1 and Q5 for LP/4 from the time point 0.

Next, the switching elements Q2 and Q6 (pair 2) are turned on during a subperiod from a time point t1', which is earlier than the time point t1 by a time period $\alpha$, until the time point t2. That is, the switching elements Q2 and Q6 are turned on for $\alpha$+LP/4 from the time point t1'. In other words, the ON signal (control signal) is supplied to the switching elements Q2 and Q6 for $\alpha$+LP/4 from the time point t1'. As a result, a time during which the ON signal is supplied to the pair 1 overlaps a time during which the ON signal is supplied to the pair 2 by the time period $\alpha$. During the time period $\alpha$ of the overlap, the pair 1 and the pair 2 are partly driven concurrently (referred to as partial concurrent driving). In the example, the time period $\alpha$ is set to be 25% of the time during which the switching elements Q1 and Q5 are turned on (=LP/4). This will be referred to an overlap ratio of 25%.

Next, the switching elements Q3 and Q7 (pair 3) are turned on during a subperiod from a time point t2', which is earlier than the time point t2 by a time period $\alpha$, until the time point t3. That is, the switching elements Q3 and Q7 are turned on for $\alpha$+LP/4 from the time point t2'. In other words, the ON signal (control signal) is supplied to the switching elements Q3 and Q7 for $\alpha$+LP/4 from the time point t2'. As a result, the time during which the ON signal is supplied to the pair 2 overlaps a time during which the ON signal is supplied to the pair 3 by the time period $\alpha$. During the time period $\alpha$ of the overlap, the pair 2 and the pair 3 are subjected to the partial concurrent driving.

Next, the switching elements Q4 and Q8 (pair 4) are turned on during a subperiod from a time point t3', which is earlier than the time point t3 by a time period $\alpha$, until the time point t4. That is, the switching elements Q4 and Q8 are turned on for $\alpha$+LP/4 from the time point t3'. In other words, the ON signal (control signal) is supplied to the switching elements Q4 and Q8 for $\alpha$+LP/4 from the time point t3'. As a result, the time during which the ON signal is supplied to the pair 3 overlaps a time during which the ON signal is supplied to the pair 4 by the time period $\alpha$. During the time period $\alpha$ of the overlap, the pair 3 and the pair 4 are subjected to the partial concurrent driving.

As seen from the above, the pair 1, which is the first pair, is turned on for LP/4 from the start time point of the first-half period, and the second pair and the subsequent pairs are each turned on for $\alpha$+LP/4 so that the time period during which a pair is turned on overlaps a time period during which a previous pair is turned on by the time period $\alpha$. The full bridge inverter as the comparative example turns on a pair of the switching elements Q51 and Q52 continuously during the first-half period. In contrast, the inverter illustrated in FIG. 1 turns on and off the four switching elements of each of the arm A1 and the arm A2 one by one during the first-half period LP in such a manner that time periods during which switching elements adjacent in order are turned on overlap by the time period $\alpha$. The overlaps of the time period $\alpha$ between the ON time periods of the switching elements can reduce the current flowing through each switching element while maintaining the same rectangular output voltage and output current waveform as those of the case of the full bridge inverter. As a result, a loss produced per switching element (switching loss, etc.) can be reduced. The effect will be further described below in detail.

In the example illustrated in FIG. 3, the time periods during which switching elements adjacent in order of being turned on and off are assumed to be the same but may differ between the switching elements. For example, the time by which the ON time periods of the switching elements Q1 and Q2 overlap may be different from the time by which the ON times of the switching elements Q2 and Q3 overlap.

Although the ON time periods overlap between all of adjacent switching elements in the example illustrated in FIG. 3, there may be some adjacent switching elements of which ON time periods do not overlap. For example, it is possible that the ON time periods of the switching elements Q1 and Q2 overlap, whereas the ON times of the switching elements Q2 and Q3 do not overlap.

The example of the FIG. 3 describes the operation by the inverter 101 during the first-half period, which also applies to operation by the inverter 101 during the second-half period. The operation by the inverter 101 during the second-half period will be described below with reference to FIG. 4.

Figure 4:
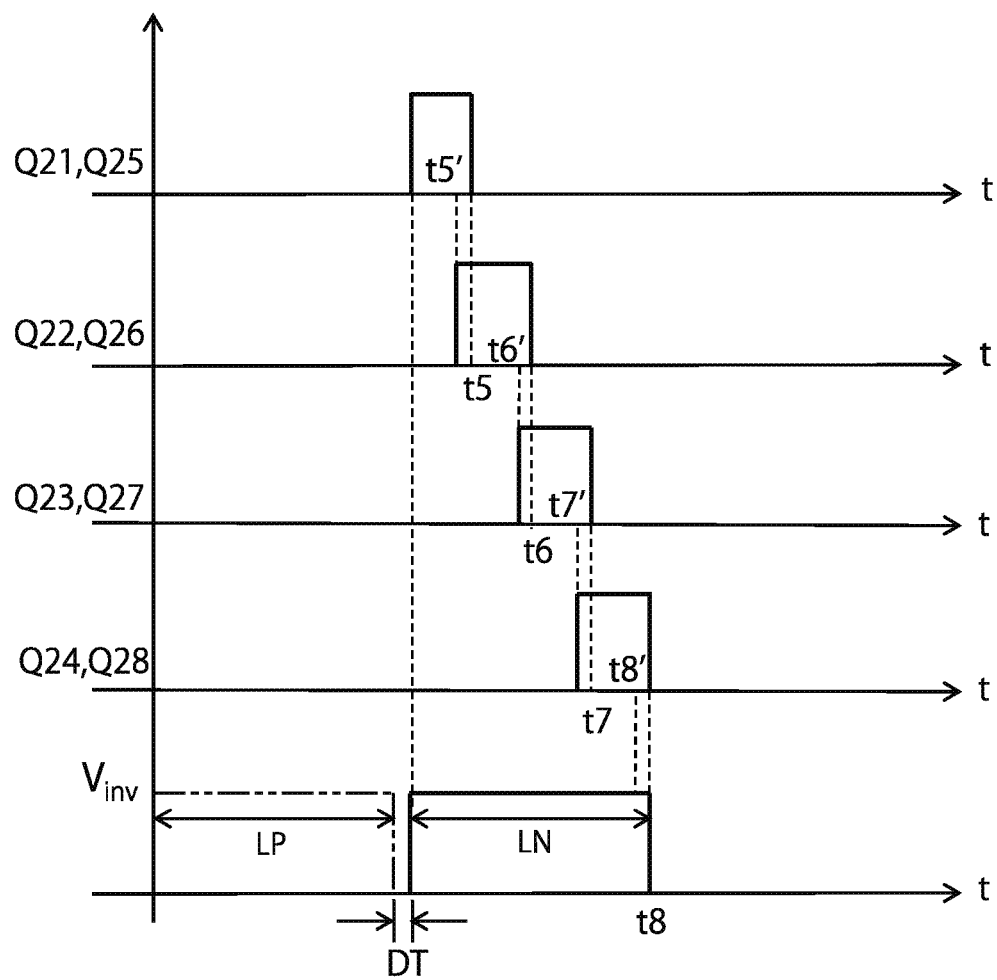
FIG. 4 is a timing chart illustrating an operation example during a second-half period.

FIG. 4 is a timing chart illustrating operation during the second-half period in detail. FIG. 4 illustrates operation that occurs after the above-described first-half period LP illustrated in FIG. 3. The second-half period is denoted by LN. Between the first-half period LP and the second-half period LN, a dead time DT is provided. Note that the dead time DT may be omitted.

FIG. 4 illustrates timings for driving (timings with which the ON signal is supplied to) the switching elements Q21 to Q24 of the arm A3 and the switching elements Q25 to Q28 of the arm A4. The right side of the lowermost graph of the FIG. 4 illustrates a timing with which the full bridge inverter illustrated in FIG. 2 drives the switching element Q53 of the arm B3 and the switching element Q54 of the arm B4.

A pair of switching elements Q21 and Q25 (pair 5) is turned on and off simultaneously. A pair of switching elements Q22 and Q26 (pair 6) is turned on and off simultaneously. A pair of switching elements Q23 and Q27 (pair 7) is turned on and off simultaneously. A pair of switching elements Q24 and Q28 (pair 8) is turned on and off simultaneously. Note that the inverter 101 may have a configuration in which switching elements of each pair are not turned on and off simultaneously.

The second-half period LN is divided into four periods having the same length, and time points at every time LN/4 from its beginning are denoted as t5, t6, t7, and t8, as illustrated in FIG. 4. After the first-half period LP, the second-half period LN starts with the dead time DT interposed therebetween.

First, the switching elements Q21 and Q25 (pair 5) are turned on during a subperiod from a start time point of the second-half period until the time point t5, for LN/4. That is, the ON signal (control signal) is supplied to the switching elements Q21 and Q25 for LN/4 from the start time point of the second-half period.

Next, the switching elements Q22 and Q26 (pair 6) are turned on during a subperiod from a time point t5', which is earlier than the time point t5 by the time period α, until the time point t6. That is, the switching elements Q22 and Q26 are turned on for α+LN/4 from the time point t5'. In other words, the ON signal (control signal) is supplied to the switching elements Q22 and Q26 for α+LN/4 from the time point t5'. As a result, the time during which the ON signal is supplied to the pair 5 overlaps a time during which the ON signal is supplied to the pair 6 by the time period α. During the time period α of the overlap, the pair 5 and the pair 6 are subjected to the partial concurrent driving.

Next, the switching elements Q23 and Q27 (pair 7) are turned on during a subperiod from a time point t6', which is earlier than the time point t6 by the time period α, until the time point t7. That is, the switching elements Q23 and Q27 are turned on for α+LN/4 from the time point t6'. In other words, the ON signal (control signal) is supplied to the switching elements Q23 and Q27 for α+LN/4 from the time point t6'. As a result, the time during which the ON signal is supplied to the pair 6 overlaps a time during which the ON signal is supplied to the pair 7 by the time period α. During the time period α of the overlap, the pair 6 and the pair 7 are subjected to the partial concurrent driving.

Next, the switching elements Q24 and Q28 (pair 8) are turned on during a subperiod from a time point t7', which is earlier than the time point t7 by the time period α, until the time point t8. That is, the switching elements Q24 and Q28 are turned on for α+LN/4 from the time point t7'. In other words, the ON signal (control signal) is supplied to the switching elements Q24 and Q28 for α+LN/4 from the time point t7'. As a result, the time during which the ON signal is supplied to the pair 7 overlaps a time during which the ON signal is supplied to the pair 8 by the time period α. During the time period α of the overlap, the pair 7 and the pair 8 are subjected to the partial concurrent driving.

As seen from the above, the pair 5, which is the first pair, is turned on for LN/4, and the pair 6 and the subsequent pairs are each turned on for α+LN/4 so that the time period during which a pair is turned on overlaps a time period during which a previous pair is turned on by the time period α. The full bridge inverter as the comparative example turns on a pair of the switching elements Q53 and Q54 continuously during the second-half period. In contrast, the inverter illustrated in FIG. 1 turns on and off the switching elements of each of the arm A3 and the arm A4 one by one during the second-half period LN in such a manner that time periods during which switching elements adjacent in order of being turned on and off are turned on overlap by (the switching elements are subjected to the partial concurrent driving for) the time period α. The overlaps between the ON time periods of the switching elements can reduce the current flowing through each switching element while maintaining the same rectangular output voltage and output current waveform as those of the case of the full bridge inverter. As a result, the loss produced per switching element can be reduced.

Figure 5A:
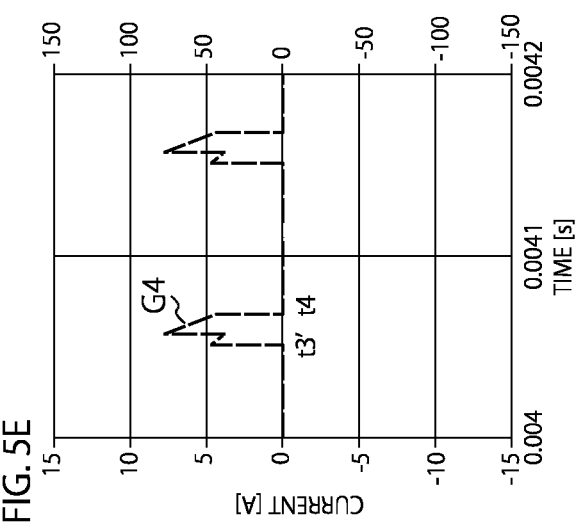
FIGS. 5A to 5E each is a diagram illustrating an example of a simulation result.
Figure 5B:
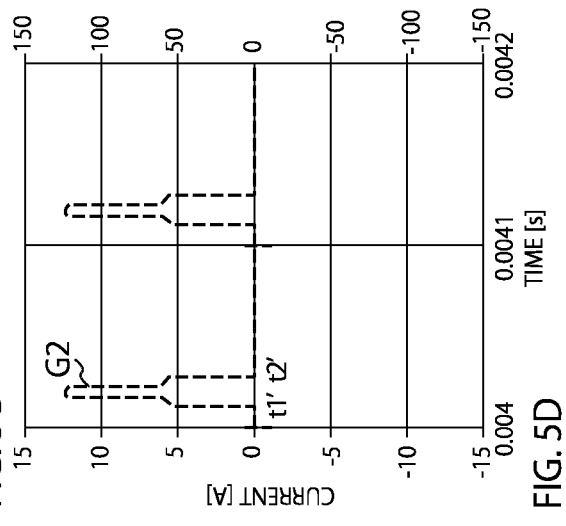
Figure 5C:
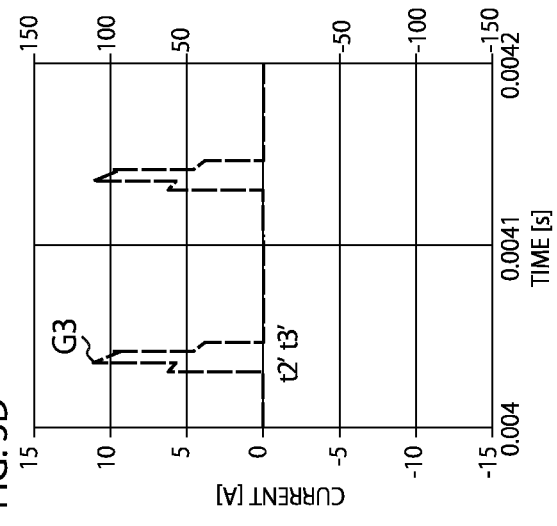
Figure 5D:
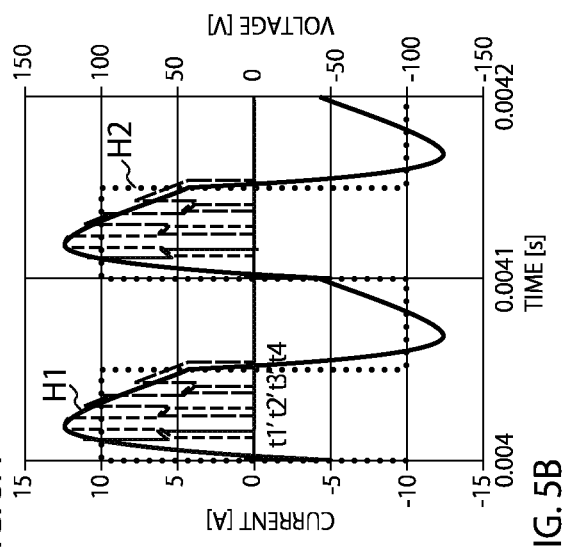
Figure 5E:
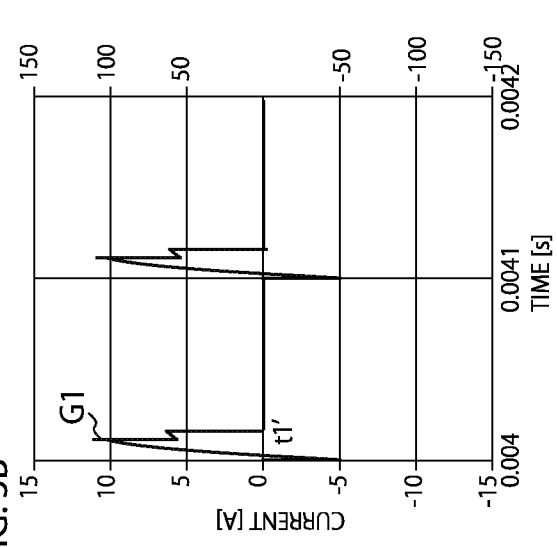

FIG. 5A illustrates a result of a simulation of a current flowing through the load circuit 301 and currents flowing through the switching elements Q1 to Q4 of the arm A1 during the first-half period in a case where a rectangular wave having a fundamental frequency of 10 kHz and an effective value of 100 V is generated as an output waveform of the inverter 101. The dead time is set at 0.1 μs, the time period α by which the supplies of the ON signal between switching elements overlap is set at 5 μs for all of the switching elements. The time period α of 5 μs is equivalent to an overlap ratio of 25%. FIG. 5B illustrates a current of the switching element Q1, FIG. 5C illustrates a current of the switching element Q2, FIG. 5D illustrates a current of the switching element Q3, and FIG. 5E illustrates a current of the switching element Q4. Combination of the currents illustrated in FIG. 5B to FIG. 5E gives a current of the load circuit 301 illustrated in FIG. 5A.

Currents flowing through the switching elements Q5 to Q8 of the arm A2 are the same as those of the switching elements Q1 to Q4 of the arm A1. Currents flowing through the switching elements Q21 to Q24 of the arm A3 during the second-half period and the currents flowing through the switching elements Q1 to Q4 of the arm A1 during the first-half period are different in their directions but are the same in their magnitudes. Similarly, currents flowing through the switching elements Q25 to Q28 of the arm A4 during the second-half period and the currents flowing through the switching elements Q5 to Q8 of the arm A2 during the first-half period are different in their directions but are the same in their magnitudes.

A graph G1 illustrates the current of the switching element Q1, a graph G2 illustrates the current of the switching element Q2, a graph G3 illustrates the current of the switching element Q3, and a graph G4 illustrates the current of the switching element Q4. A graph H1 illustrates a load current being a current of the load circuit 301 (the output current of the inverter 101), and a graph H2 illustrates a load voltage being a voltage of the load circuit 301 (the rectangular output voltage of the inverter 101).

At the first time point (here, 0.004), the switching element Q1 is turned on, and the current of the switching element Q1 rises. When the switching element Q2 is turned on at the time point t1' (see FIG. 3), the switching element Q1 and the switching element Q2 are both on. As a result, the current of the switching element Q1 is substantially halved. At the time point t1, the switching element Q1 is turned off, and the current of the switching element Q1 becomes zero. As a result, the current of the switching element Q2 rises (is substantially doubled).

When the switching element Q3 is turned on at the time point t2' (see FIG. 3), the switching element Q2 and the switching element Q3 are both on. As a result, the current of the switching element Q2 is substantially halved. At the time point t2, the switching element Q2 is turned off, and the current of the switching element Q2 becomes zero. As a result, the current of the switching element Q3 rises (is substantially doubled).

When the switching element Q4 is turned on at the time point t3' (see FIG. 3), the switching element Q3 and the switching element Q4 are both on. As a result, the current of the switching element Q3 is substantially halved. At the time point t3, the switching element Q3 is turned off, and the current of the switching element Q3 becomes zero. As a result, the current of the switching element Q4 rises (is substantially doubled).

At the time point t4 (see FIG. 3), the switching element Q4 is turned off. The switching elements Q5 to Q8 are turned on and off with the same timings as those of the switching elements Q1 to Q4. The currents flowing through the switching elements Q5 to Q8 are the same as those of the switching elements Q1 to Q4.

After a lapse of the dead time DT, the second-half period starts, and the switching elements Q21 to Q28 are switched with the same timings as those of the switching elements Q1 to Q8. As a result, signals flowing through the switching elements Q21 to Q28 are opposite to those of the switching elements Q1 to Q8. The load voltage and the load current have a direction opposite to that of the load voltage and the load current during the first-half period and have the same magnitudes as those of the load voltage and the load current during the first-half period (see FIG. 5).

The next cycle starts at a time point (0.0041), and subsequently, the operations that occur during the above-described first-half period and the second-half period alternate.

As seen from the above, while switching elements are driven one by one in each arm, the time periods during which switching elements are subjected to the partial concurrent driving is provided. This can reduce the current flowing through each switching element while outputting the same rectangular voltage and current waveform as those of the full bridge inverter. As a result, the loss produced per switching element can be reduced.

In FIG. 3 and FIG. 4 described above, the overlap ratio is set at 25%. An operation example with a different overlap ratio will be described.

Figure 6:
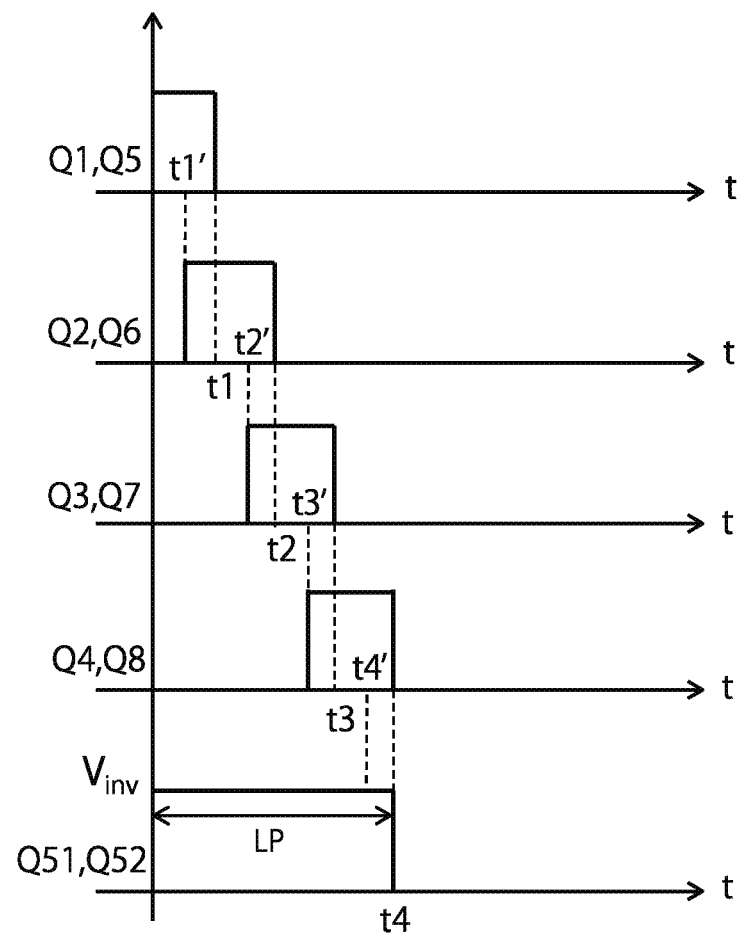
FIG. 6 is a timing chart illustrating an operation example during the first-half period.

FIG. 6 is a timing chart illustrating an operation example during the first-half period in a case where the overlap ratio is 50%. The operation is the same as that illustrated in FIG. 3 except that the overlap ratio differs, and thus will not be described in detail. Operation that occurs during the second-half period is also the same as described with reference to FIG. 4 except that the overlap ratio is different, and thus will not be described.

FIG. 7A illustrates a result of a simulation of a current flowing through the load circuit 301 and currents flowing through the switching elements Q1 to Q4 of the arm A1 during the first-half period at an overlap ratio of 50% in a case where a rectangular wave having a fundamental frequency of 10 kHz and an effective value of 100 V is generated as an output waveform of the inverter 101. FIG. 7B illustrates a current of the switching element Q1, FIG. 7C illustrates a current of the switching element Q2, FIG. 7D illustrates a current of the switching element Q3, and FIG. 7E illustrates a current of the switching element Q4. Combination of the currents illustrated in FIG. 7B to FIG. 7E gives a current of the load circuit 301 illustrated in FIG. 7A. The dead time is set at 0.3 µs, and the time period α of the overlap is set at 10 µs. The time period α of 10 µs is equivalent to an overlap ratio of 50%. Graphs G11 to G14 illustrate the currents of the switching elements Q1 to Q4. A graph H11 illustrates the load current and a graph H12 illustrates the load voltage.

The operation is basically the same as illustrated in FIG. 5. However, currents flowing through switching elements (particularly through the switching elements Q2 and Q3) are significantly suppressed in the vicinity of a maximum value of the load current when compared with the case illustrated in FIG. 5. The current of the switching element Q2 is suppressed to about half the maximum value of the load current at the highest because the switching element Q3 is turned on when the current of the switching element Q2 rises to about half the maximum value of the load current.

As seen from the above, while switching elements Q1 to Q4 are driven one by one in each arm, the time periods during which switching elements Q1 to Q4 are driven concurrently is provided. This can reduce the current flowing through each switching element while outputting the same rectangular voltage and current waveform as those of the full bridge inverter. As a result, the loss produced per switching element can be reduced. In addition, by extending the time period during which switching elements are driven concurrently more than the case illustrated in FIG. 5, although a length of a time of turning on per switching element increases, a maximum value of current flowing through one switching element can be reduced more than in the case illustrated in FIG. 5. As a result, the loss produced per switching element can be significantly reduced more than the case illustrated in FIG. 5.

Similar to the case illustrated in FIG. 5, currents flowing through the switching elements Q5 to Q8 are the same as those of the switching elements Q1 to Q4 of the arm A1. Currents flowing through the switching elements Q21 to Q28 during the second-half period and the currents flowing through the switching elements Q1 to Q8 during the first-half period are different in their directions but are the same in their magnitudes.

In the present embodiment, the four switching elements are driven concurrently while the same cycle as that of the full bridge inverter as the comparative example illustrated in FIG. 2 is maintained. That is, the ON signals to the four switching elements (or the output signals of the four switching elements) are overlapped during each of the first-half period and the second-half period in such a manner as not to change the cycle of the comparative example illustrated in FIG. 2. A supplemental description will be given of a principle underlying how to drive a plurality of switching elements concurrently while the same cycle as that of the full bridge inverter as the comparative example illustrated in FIG. 2 is maintained.

Assume that "n" switching elements are provided in each of positive side arms (A1 and A3), and "m" switching elements are provided in each of negative side arms (A2 and A4). The present embodiment is configured such that n=4 and m=4.

In this case, a time period "$T_{on}$" during which one switching element is turned on in the positive side arm is expressed by the following formula.

$$T_{on}=(T/2n)-(dT/n)+(n-1)T_{shift}/n \quad (1)$$

The symbol "n" denotes a number of the switching elements included in each positive side arm. In a case where only some of the switching elements of each positive side arm are used, "n" denotes a number of the switching elements used.

The symbol "dT" denotes the dead time.

The symbol "T" denotes a length of one cycle.

The symbol "$T_{shift}$" denotes a time period during which the ON signals to the adjacent switching elements overlap.

A delay time $T_d h$ of an ON signal to a "h"-th switching element on each positive side arm is expressed by the following formula.

$$T_{dh}=(h-1)(T_{on}-T_{shift}) \quad (2)$$

where "h" is an integer not less than one and not more than "n."

A time period "$T'_{on}$" during which one switching element is turned on in the negative side arm is expressed by the following formula.

$$T'_{on}=(T/2m)-(dT/m)+(m-1)T_{shift}/m \quad (3)$$

The symbol "m" denotes a number of the switching elements included in each negative side arm. In a case where only some of the switching elements of each negative side arm are used, "m" denotes a number of the switching elements used.

The symbol "dT" denotes the dead time.

The symbol "T" denotes a length of one cycle.

The symbol "$T_{shift}$" denotes a time period during which the ON signals to the adjacent switching elements overlap.

A delay time $T_d k$ of an ON signal to a "k"-th switching element on each negative side arm is expressed by the following formula.

$$T_{dk}=(k-1)(T_{on}-T_{shift}) \quad (4)$$

where "k" is an integer not less than one and not more than "m."

The formulae (1) to (4) will be described with reference to FIGS. 12A to 12C.

Figure 12A:
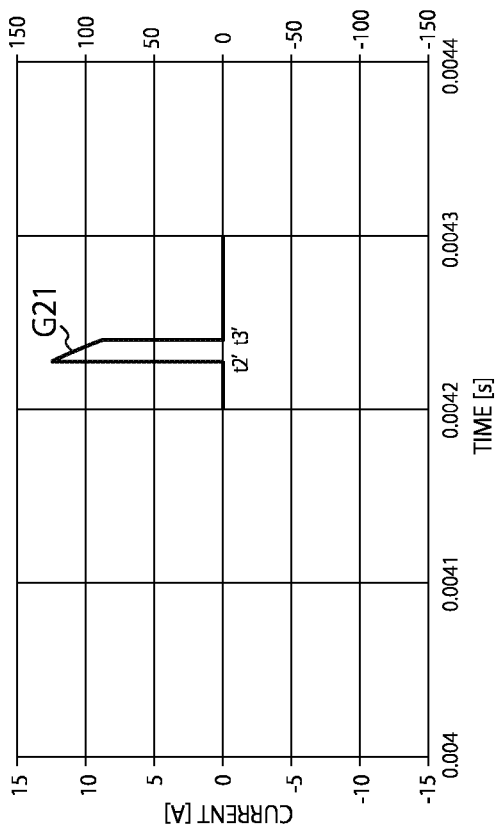
FIGS. 12A to 12D each is a diagram illustrating an example of a simulation result.
Figure 12C:
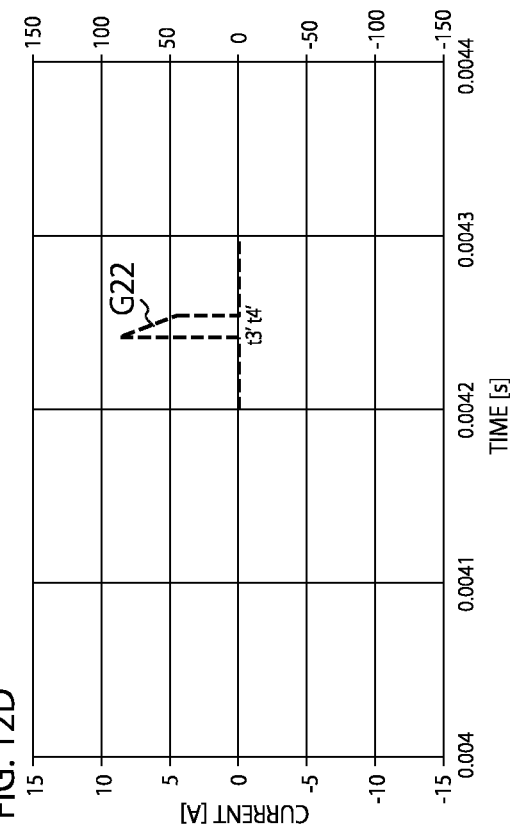
Figure 12B:
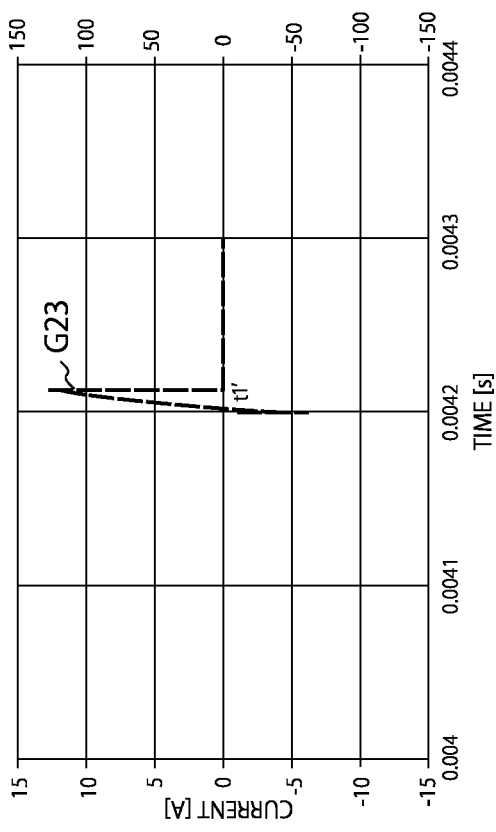
Figure 12D:
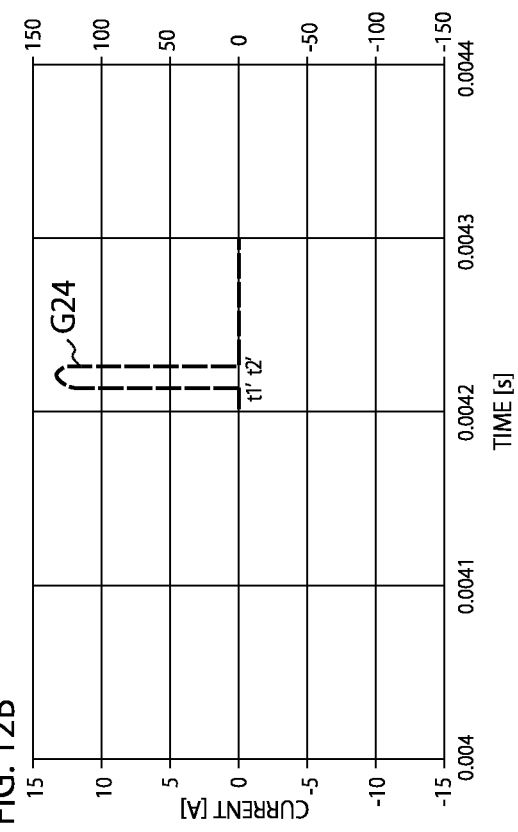
Figures 13A, 13B, 13C, 13D:
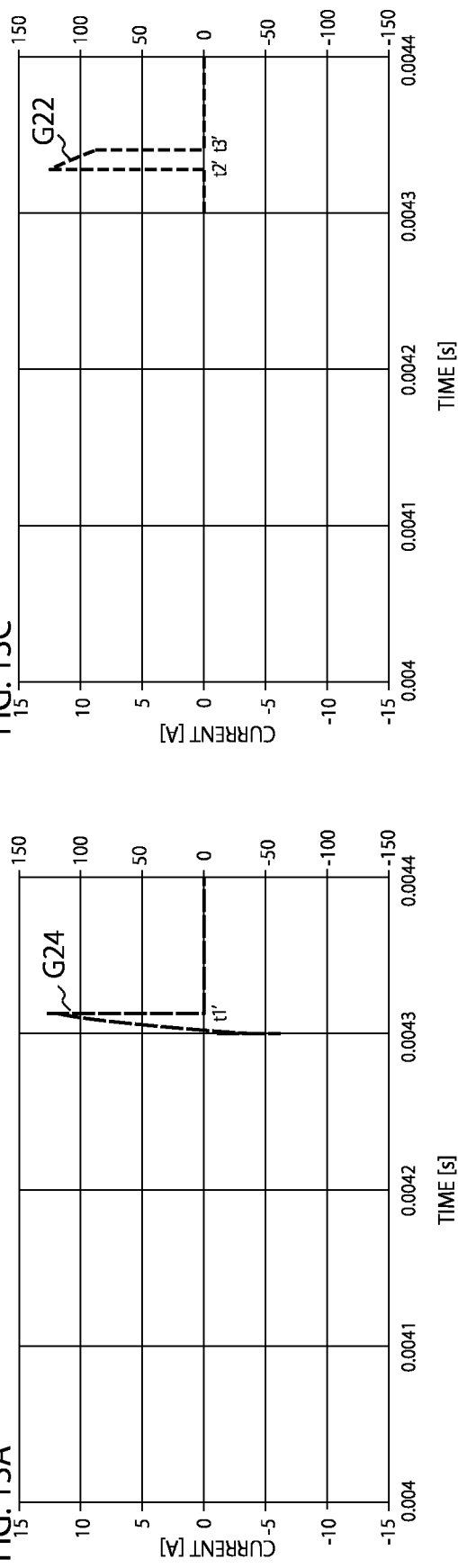
FIGS. 13A to 13D each is a diagram illustrating an example of a simulation result.

FIGS. 12A to 12C is a diagram illustrating a principle of the present embodiment. FIG. 16A illustrates operational timings in a case where the ON signals are supplied to the four switching elements on a positive side arm for the same time period ($T_{on}$) during the first-half period of a cycle T in such a manner that the ON signals do not overlap each other. A case where the positive side arm is the arm A1 (switching elements Q1 to Q4) illustrated in FIG. 1 is illustrated. A delay time $T_{d2}$ of the switching element Q2, a delay time $T_{d3}$ of the switching element Q3, and a delay time $T_{d4}$ of the switching element Q4 are illustrated. Since there is no overlap between the ON signals, $T_{d2}$ is the same as $T_{on}$. A delay time $T_{d1}$ of the switching element Q1 is zero. T/2 indicates a half cycle. The dead time DT is provided.

FIG. 16B illustrates a state in which the ON signals to the switching elements shifted from the state illustrated in FIG. 16A toward the left of the paper with lengths of the ON signals to the switching elements kept unchanged so that the ON signals overlap each other by $T_{shift}$. That is, the ON signal to the switching element Q2 overlaps the ON signal to the switching element Q1 by $T_{shift}$. Similarly, the ON signal to the switching element Q3 overlaps the ON signal to the switching element Q2 by $T_{shift}$. The ON signal to the switching element Q4 overlaps the ON signal to the switching element Q3 by $T_{shift}$. Since lengths of the ON signals are the same as in the state illustrated in FIG. 16A, an ON period of each positive side arm is shortened by $3 \times T_{shift}/4$.

FIG. 16C illustrates a state in which the lengths $T_{on}$ of the ON signals are extended evenly from the state illustrated in FIG. 16B with the overlaps of $T_{shift}$ kept unchanged so that the ON period of the positive side arm becomes the same as illustrated in FIG. 16A. The extension of the time period $T_{on}$ of each ON signal by $3 \times T_{shift}/4$ can make the ON period of each positive side arm the same as illustrated in FIG. 16A with the overlaps between the ON signals kept at $T_{shift}$. In terms of "n", the lengths of the ON signals are extended by $(n-1)T_{shift}/n$. The state illustrated in FIG. 16C is expressed by Formula (1) and Formula (2).

The description about each positive side arm given here also applies to each negative side arm.

In the first embodiment, each arm includes a plurality of switching elements. However, at least one of the arms may include a plurality of switching elements, and the other arms may each include only one switching element. In this case, the partial concurrent driving is performed on at least one of the arms, and in each of the other arms, the one switching element is turned on during one of the first-half period and the second-half period.

In the first embodiment, the partial concurrent driving of switching elements is performed on all of the four arms. However, the partial concurrent driving may be performed on at least one of the arms, and switching elements in the other arms may be driven by a given method. For example, the above-mentioned partial concurrent driving is performed on the arms A1 and A2 during the first-half period. In contrast, during the second-half period, one switching element of each of the arms A3 and A4 may be turned on all the time. This case can also provide the advantageous effect of the present embodiment during the first-half period.

As described above, in the present embodiment, a plurality of switching elements are subjected to the partial concurrent driving in each arm. This can reduce the current flowing through each switching element while outputting the same rectangular voltage and current waveform as those of the full bridge inverter. Even if there are variations in on-resistances of the switching elements, switching losses attributable to the on-resistances can be reduced. In a case of switching elements having large on-resistances, the time period α may be made longer. This can reduce a number of cases where excessively large current flows through a switching element driven with a certain timing to cause a malfunction, and the switching element disposed at a specific place frequently needs replacement.

(Modification)

The control circuit 401 may include a detection circuit that detects a malfunction of a switching element. For example, the detection circuit feeds a test signal to a gate terminal of a switching element. If current having a predetermined value fails to flow, the detection circuit determines a malfunction occurs in the switching element. A method for the test is not limited to this method. It is possible to use a tester. In a case where a malfunction of a switching element of an arm is detected, the control circuit 401 may perform the above-described partial concurrent driving on switching elements other than the switching element with the malfunction. For example, in a case where a malfunction of the switching element Q4 is detected of the switching elements Q1 to Q4 of the arm A1, the control circuit 401 performs the partial concurrent driving on the switching elements Q1 to Q3. As seen from the above, even if a malfunction occurs in a switching element, the arm including the switching element with the malfunction occurring can be used continuously.

Second Embodiment

A characteristic of a second embodiment is that an order of driving switching elements is changed for each cycle in at least one of arms. In the present embodiment, four arms are all subjected to the change of the order of driving switching elements, but only at least one of the arms may be subjected to the change.

A block diagram of the second embodiment is the same as illustrated in FIG. 1. The second embodiment differs only in operation by the control circuit 401.

The control circuit 401 changes an order of driving four switching elements of each arm, that is, an arrangement order of subperiods for supplying ON signals to the four switching elements, for each cycle. This will be described about the arm A1 for example. In the first cycle, the switching elements Q1, Q2, Q3, and Q4 are driven in this order. In the next cycle, the driving is performed in an order of the switching elements Q2, Q3, Q4, and Q1. In a cycle after the next cycle, the driving is performed in an order of the switching elements Q3, Q4, Q1, and Q2. In a case where the number of the switching elements is 4, a number of orders of the driving is 24, but it is not necessary to use all of the orders. Using at least two of the orders will suffice. The order of driving switching elements may be determined for each arm independently.

The present embodiment may be combined with the first embodiment; four switching elements may be subjected to the partial concurrent driving. Alternatively, the four switching elements may be driven in the order in such a manner that the ON time periods do not overlap (i.e., at an overlap ratio of 0%).

Operation by the inverter 101 of the present embodiment will be described below in detail. In the following operation, turning on and off the switching elements is controlled by the control circuit 401.

Figures 8A, 8B:
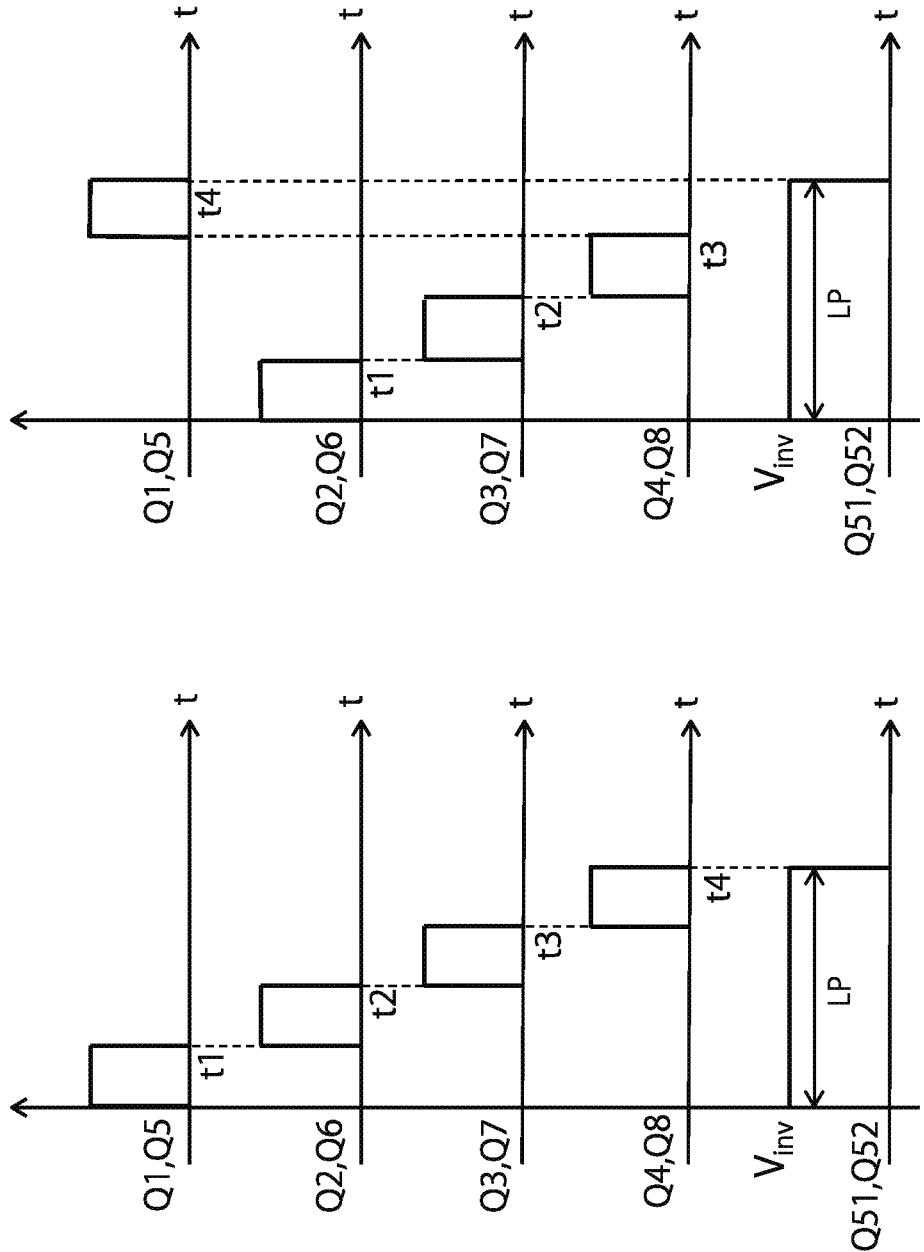
FIGS. 8A and 8B are timing charts illustrating operation during the first-half period of a first cycle and operation during the first-half period of a second cycle according to a second embodiment.

FIG. 8A is a timing chart illustrating an operation example during a first-half period of a first cycle. FIG. 8B is a timing chart illustrating an operation example during a first-half period of a second cycle. FIG. 8A and FIG. 8B illustrate timings for driving the switching elements Q1 to Q4 of the arm A1 and the switching elements Q5 to Q8 of the arm A2. The lowermost graph of the FIGS. 8A and 8B illustrates a timing with which the full bridge inverter illustrated in FIG. 2 drives the switching element Q51 of the arm B1 and the switching element Q52 of the arm B2. In FIG. 8A and FIG. 8B, the arm A1 and the arm A2 are turned on during the first-half period. However, as long as the arm A1 and the arm A2 are turned on during at least part of the first-half period, there may be a time period during which neither the arm A1 nor the arm A2 is turned on. As described above, the arm A1 and the arm A2 being turned on means that at least one switching element included in each of the arm A1 and the arm A2 is turned on.

In the arm A1, the driving is performed in an order of the switching elements Q1, Q2, Q3, and Q4 in the first cycle, and in an order of the switching elements Q2, Q3, Q4, and Q1 in the second cycle. That is, letting subperiods 1 to 4 denote subperiods for supplying ON signals to the switching elements Q1 to Q4, the subperiods are arranged in the first cycle in an order of the subperiod 1, the subperiod 2, the subperiod 3, and the subperiod 4. Similarly, in the second cycle, the subperiods are arranged in an order of the subperiod 2, the subperiod 3, the subperiod 4, and the subperiod 1.

In the arm A2, the driving is performed in an order of the switching elements Q5, Q6, Q7, and Q8 in the first cycle, and in an order of the switching elements Q6, Q7, Q8, and Q5 in the second cycle. That is, letting subperiods 5 to 8 denote subperiods for supplying ON signals to the switching elements Q5 to Q8, the subperiods are arranged in the first cycle in an order of the subperiod 5, the subperiod 6, the subperiod 7, and the subperiod 8. Similarly, in the second cycle, the subperiods are arranged in an order of the subperiod 6, the subperiod 7, the subperiod 8, and the subperiod 5.

In FIG. 8A, first, the switching elements Q1 and Q5 are turned on for LP/4 from a start time point of the first-half period (here set as a time point 0). That is, the ON signal (control signal) is supplied to the switching elements Q1 and Q5 during a subperiod from the time point 0 until a time point t1.

Next, the switching elements Q2 and Q6 are turned on from the time point t1 until a time point t2. That is, the ON signal (control signal) is supplied to the switching elements Q2 and Q6 during a subperiod from the time point t1 until the time point t2.

Next, the switching elements Q3 and Q7 are turned on from the time point t2 until a time point t3. That is, the ON signal (control signal) is supplied to the switching elements Q3 and Q7 during a subperiod from the time point t2 until the time point t3.

Next, the switching elements Q4 and Q8 are turned on from the time point t3 until a time point t4. That is, the ON signal (control signal) is supplied to the switching elements Q4 and Q8 during a subperiod from the time point t3 until the time point t4.

Subsequently, operation by the arm A3 and arm A4 is performed during the second-half period of the first cycle, and then the first-half period of the second cycle starts. Operation by the arm A1 and the arm A2 during the first-half period of the second cycle is illustrated in FIG. 8B.

In FIG. 8B, first, the switching elements Q2 and Q6 are turned on for LP/4 from a start time point of the first-half period of the second cycle. That is, the ON signal (control signal) is supplied to the switching elements Q2 and Q6 during a subperiod from the start time point of the first-half period of the second cycle until a time point t1.

Next, the switching elements Q3 and Q7 are turned on from the time point t1 until a time point t2. That is, the ON signal (control signal) is supplied to the switching elements Q3 and Q7 during a subperiod from the time point t1 until the time point t2.

Next, the switching elements Q4 and Q8 are turned on from the time point t2 until a time point t3. That is, the ON signal (control signal) is supplied to the switching elements Q4 and Q8 during a subperiod from the time point t2 until the time point t3.

Next, the switching elements Q1 and Q5 are turned on from the time point t3 until a time point t4. That is, the ON signal (control signal) is supplied to the switching elements Q1 and Q5 during a subperiod from the time point t3 until the time point t4.

The operation by the arm A1 and the arm A2 in the first-half period of each cycle is described with reference to FIGS. 8A and 8B. During the second-half period of each cycle, the arm A3 and the arm A4 operate similarly to the arm A1 and arm A2.

Figure 9:
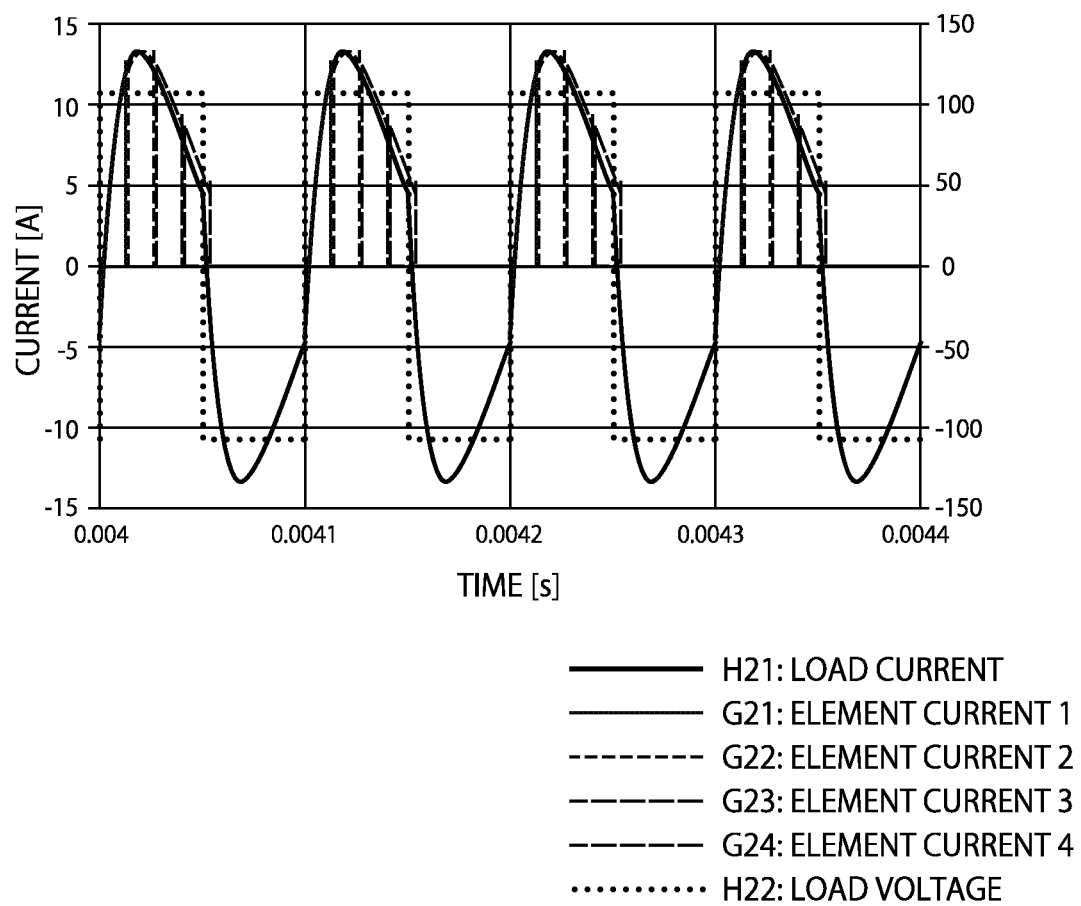
FIG. 9 is a diagram illustrating an example of a simulation result.
Figure 10A:
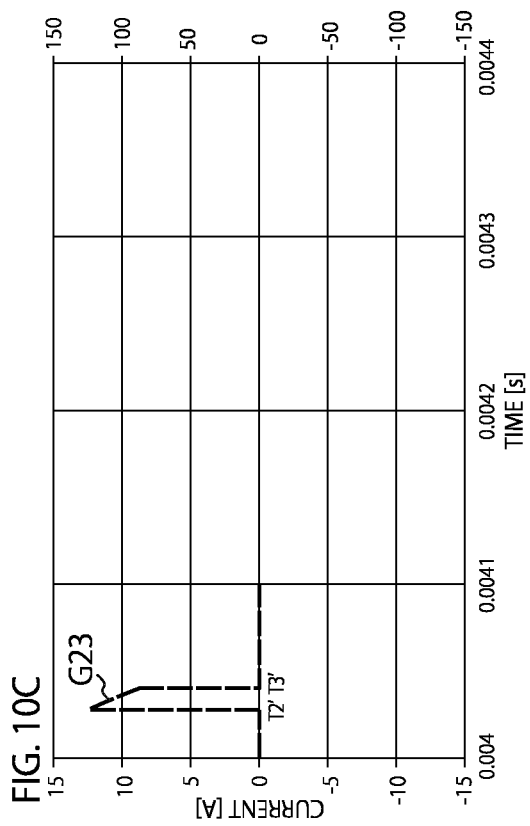
FIGS. 10A to 10D each is a diagram illustrating an example of a simulation result.
Figure 10C:
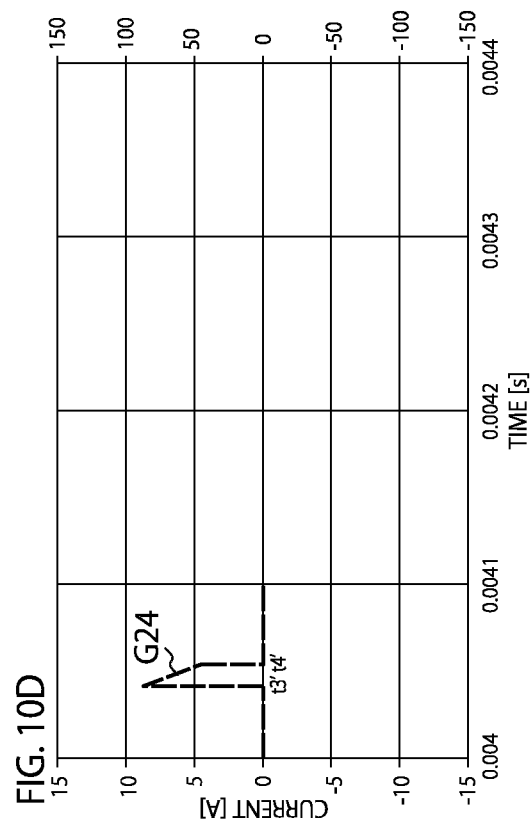
Figure 10B:
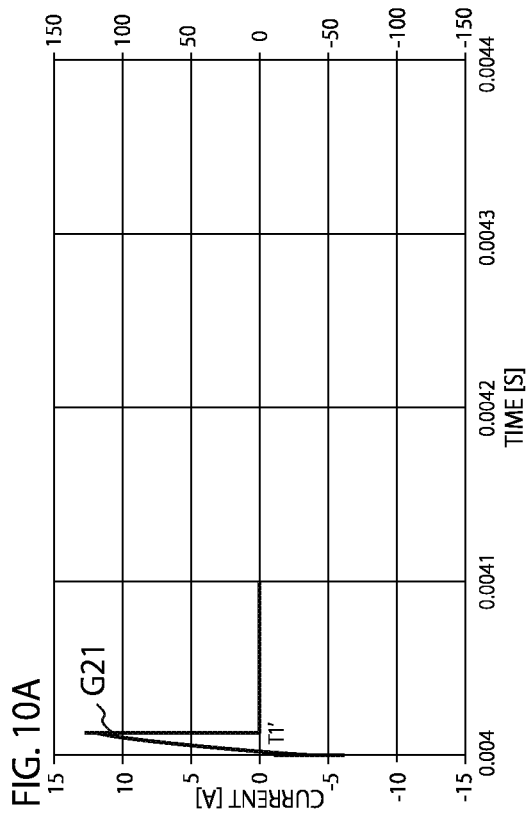
Figure 10D:
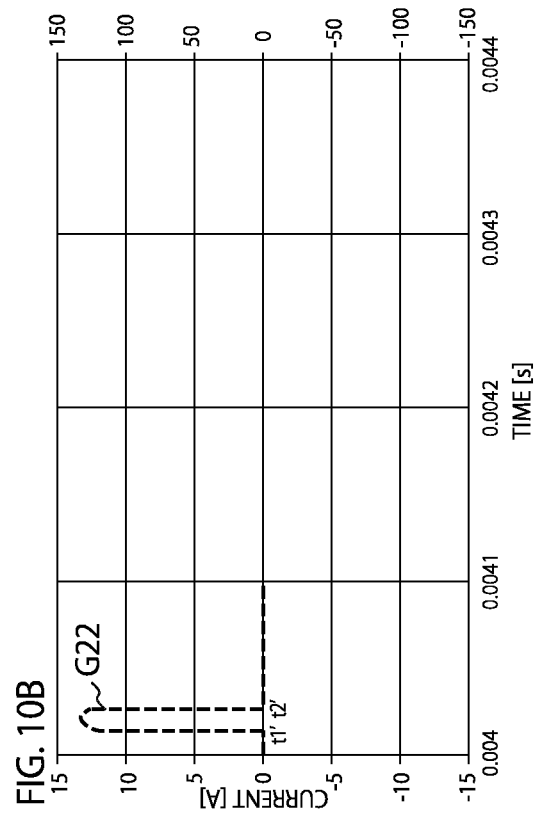
Figure 11A:
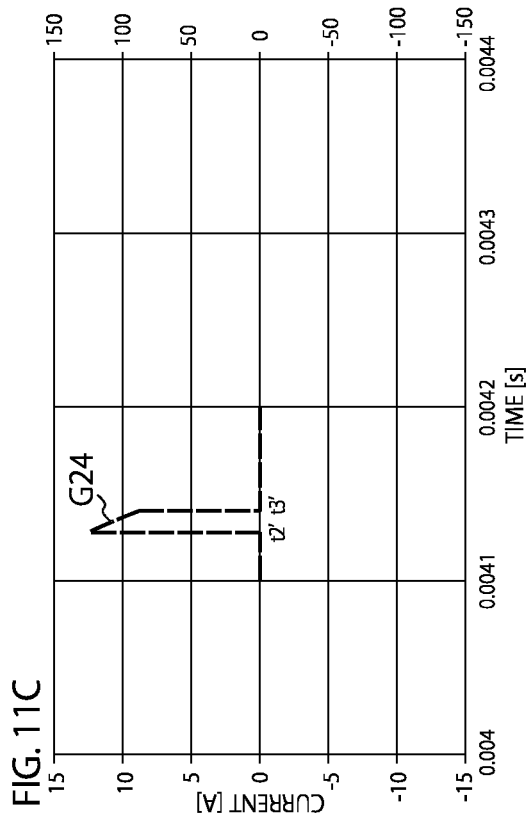
FIGS. 11A to 11D each is a diagram illustrating an example of a simulation result.
Figure 11B:
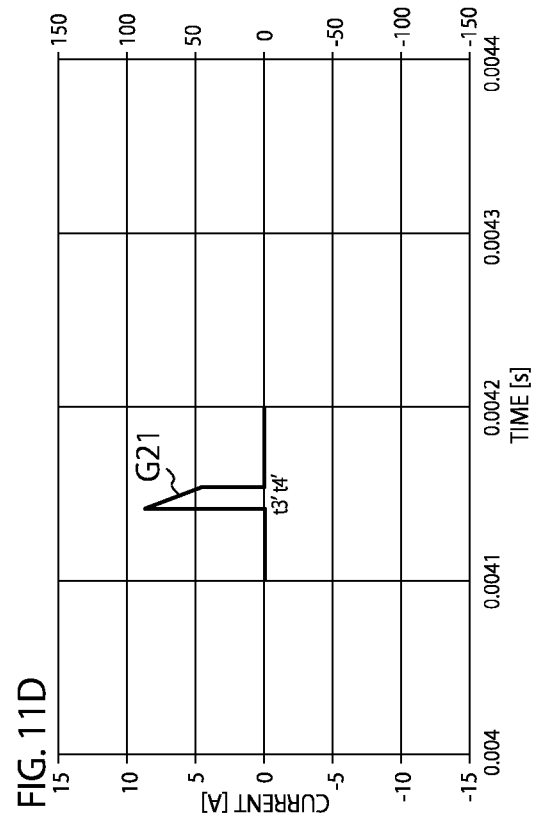
Figure 11C:
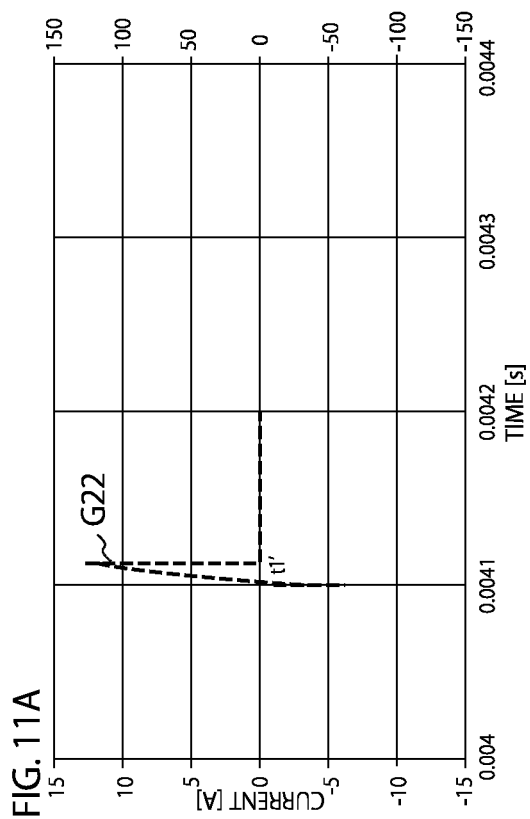
Figure 11D:
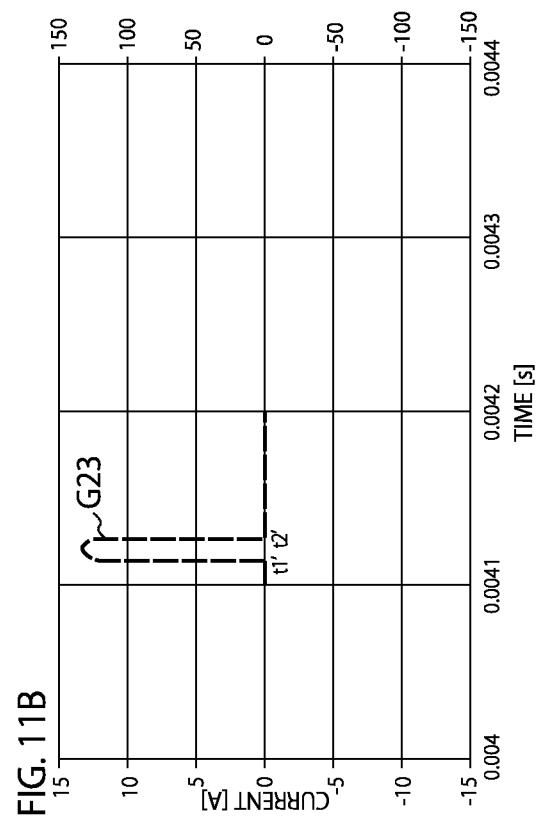

FIG. 9 illustrates a result of a simulation of a current flowing through the load circuit 301 and currents flowing through the switching elements Q1 to Q4 of the arm A1 during the first-half period in a case where a rectangular wave having a fundamental frequency of 10 kHz and an effective value of 100 V is generated as an output waveform of the inverter 101. The dead time is set at 0.3 µs, and the time period α of the overlap is set at 0 µs. The time period α of 0 µs is equivalent to an overlap ratio of 0%. Graphs G21 to G24 illustrate the currents of the switching elements Q1 to Q4. A graph H21 illustrates the load current and a graph H22 illustrates the load voltage. FIG. 11A, FIG. 11B, FIG. 11C, and FIG. 11D illustrate the currents of the switching elements Q1, Q2, Q3, and Q4 in the first cycle, respectively. FIG. 11A, FIG. 11B, FIG. 11C, and FIG. 11D illustrate the currents of the switching elements Q1, Q2, Q3, and Q4 in the second cycle, respectively. FIG. 12A, FIG. 12B, FIG. 12C, and FIG. 12D illustrate the currents of the switching elements Q1, Q2, Q3, and Q4 in a third cycle, respectively. FIG. 13A, FIG. 13B, FIG. 13C, and FIG. 13D illustrate the currents of the switching elements Q1, Q2, Q3, and Q4 in a fourth cycle, respectively.

The order of driving the switching elements Q1 to Q4 changes every cycle. In the first cycle, as illustrated in FIG. 9, particularly FIG. 9B, the switching elements Q1, Q2, Q3, and Q4 are driven in this order. In the second cycle, as illustrated in FIG. 9, particularly FIG. 9C, the switching elements Q2, Q3, Q4, and Q1 are driven in this order. In the third cycle, as illustrated in FIG. 9, particularly FIG. 9D, the switching elements Q3, Q4, Q1, and Q2 are driven in this order. In the fourth cycle, as illustrated in FIG. 9, particularly FIG. 9E, the switching elements Q4, Q1, Q2, and Q3 are driven in this order.

As seen from the above, by changing the order of driving the switching elements Q1 to Q4 every cycle, losses produced by the switching elements can be leveled. For example, currents of the second and the third driven switching elements are larger than currents of the first and the fourth driven switching elements, and losses of the second and the third driven switching elements are larger than losses of the first and the fourth driven switching elements. Therefore, the change of the order of driving can level the losses between the switching elements.

As a method for changing the order of driving the switching elements Q1 to Q4 every cycle, the order of driving the switching elements Q1 to Q4 may be determined randomly. This can also level the losses between the switching elements.

Third Embodiment

A characteristic of a third embodiment is that time periods of driving (ON time periods of) switching elements or an overlap between the time periods of driving switching elements are changed based on the current values of the switching elements in at least one of arms. As an initial state, the switching elements may be subjected to the partial concurrent driving according to the first embodiment. Alternatively, the switching elements may not be subjected to the partial concurrent driving but driven in a fixed order (at an overlap ratio of 0%). In the present embodiment, all of the four arms are subjected to the change, but at least one of the arms may be subjected to the change.

Figure 14:
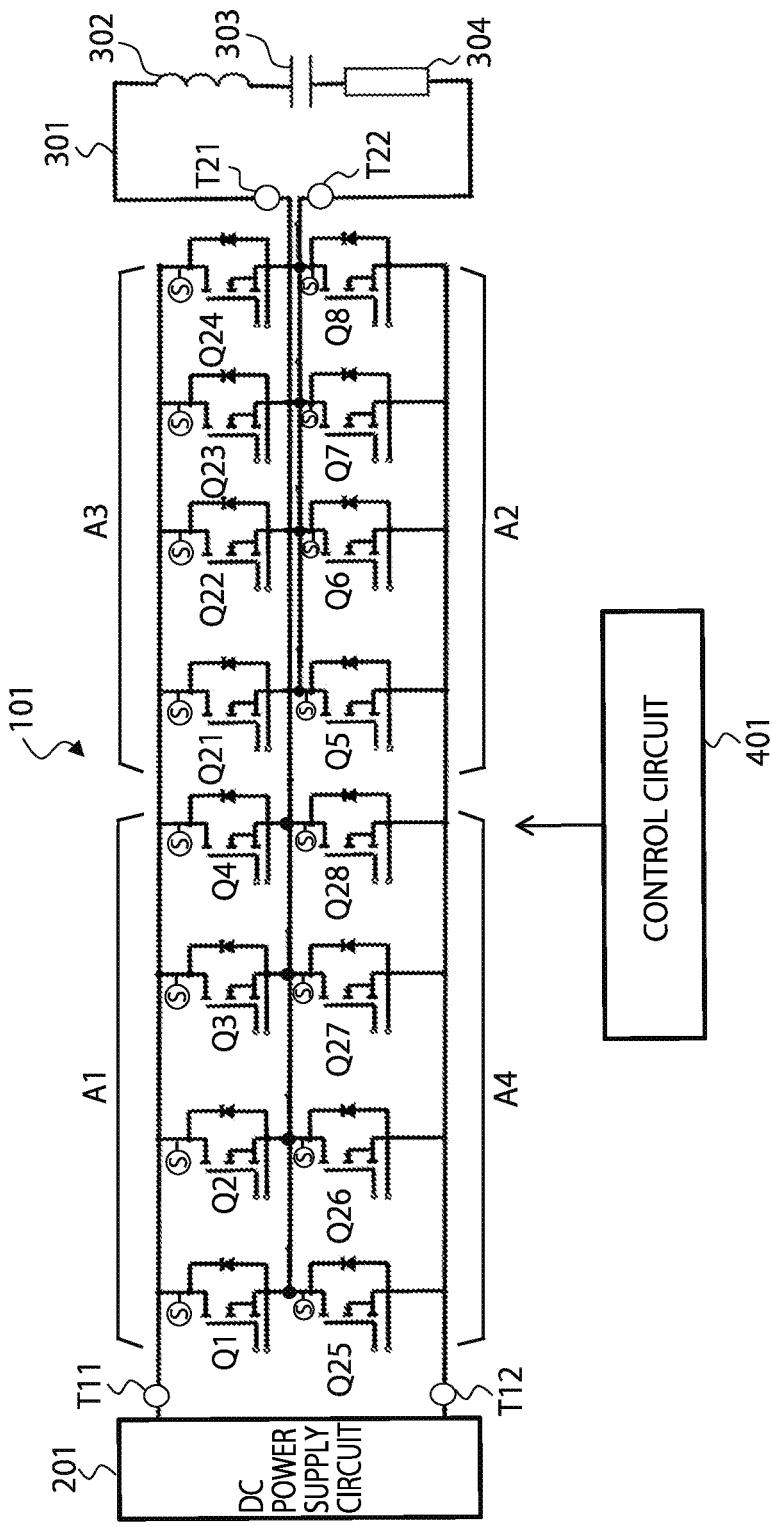
FIG. 14 is a diagram illustrating a configuration example of an electric power system according to a third embodiment.

FIG. 14 illustrates a configuration example of an electric power system according to the third embodiment. Current sensors S are connected to drain terminals of the switching elements Q1 to Q8 and Q21 to Q28. The current sensors S are connected to the control circuit 401 via wirings not illustrated. The current sensors S measure current values of the switching elements Q1 to Q8 and Q21 to Q28 and transmit the measured values to the control circuit 401. The values transmitted to the control circuit 401 each may be a maximum value or an average value of the measured values or may be values of measurement at a given time point (e.g., values obtained when a certain time period elapses from turning on the switching elements).

Based on the current values of the switching elements Q1 to Q8 and Q21 to Q28, the control circuit 401 controls lengths of time periods of driving the switching elements.

For example, assume that the four switching elements of each of the arms A1 to A4 are driven in a fixed order with no time period of the overlap (at an overlap ratio of 0%), as the initial state (see FIG. 8A). The control circuit 401 compares the current values of the switching elements Q1 to Q4 of the arm A1 with a threshold value to determine whether there is any switching element of which the current value exceeds the threshold value. In a case where such a switching element is present, the control circuit 401 extends a time period of driving the switching element in question to increase a time period of overlap by a certain value and performs the partial concurrent driving as in the first embodiment (see FIG. 3). The increasing of the overlapped time period by the certain value is repeated until the current value decreases to not more than the threshold value. The same operation is performed on the arms A2 to A4. This can keep the current values of all of the switching elements to not more than the threshold value, so as to reduce the losses of the switching elements. Here, the current values are kept to not more than the threshold value for all of the switching elements of each arm here. However, the lengths of the time periods of driving the switching elements may be controlled so as to limit a number of switching elements of which the current values exceed the threshold value to a certain number (not less than one).

FIG. 15A illustrates a situation in which the switching elements Q1 to Q4 are driven in this order in the first cycle at an overlap ratio of 0% (FIG. 15A is the same diagram as FIG. 8A). The current values of the switching elements Q1 to Q4 are measured. Assume that the current value of the switching element Q2 exceeds the threshold value. In this case, the time period of driving the switching element Q2 is changed in the next cycle or a cycle after the next cycle.

FIG. 15B illustrates an example in which the time period of driving the switching element Q2 is changed in the second cycle. A start of the time period of driving the switching element Q2 is advanced by a time period J. As a result, part of the time period of driving the switching element Q2 overlaps the time period of driving the switching element Q1. During the time of the overlap, the switching elements Q1 and Q2 are driven concurrently, by which the current value of the switching element Q2 is reduced. Here, the time period of driving the switching element Q2 is extended so as to overlap the time period of driving the switching element Q1 and, alternatively, can be extended so as to overlap the time period of driving the switching element Q3.

The time period of driving the switching element Q1, Q3, or Q4 corresponds to a first subperiod being part of the first-half period during which the arm A1 is turned on. The changed time period of driving the switching element Q2 corresponds to a second subperiod being part of the first-half period during which the arm A1 is turned on.

In a case where the current value of the switching element Q3 also exceeds the threshold value in the first cycle illustrated in FIG. 15A, the time period of driving the switching element Q3 may be extended in the second cycle in addition to the switching element Q2.

In FIG. 15A and FIG. 15B, the arm A1 is turned on during the first-half period. However, as long as the arm A1 is turned on during at least part of the first-half period, there may be a time period during which the arm A1 is not turned on. As described above, the arm A1 being turned on means that at least one switching element included in the arm A1 is turned on.

An example of controlling the operation on the arm A1 is illustrated in FIG. 15A and FIG. 15B. The same control is performed on the arms A2 to A4.

As described above, according to the present embodiment, the current values of the switching elements are kept to not more than the threshold value, so as to reduce the losses of the switching elements.

(Modification)

In the third embodiment, the time periods of driving switching elements are changed based on the current values of the switching elements. However, based on the current values of the switching elements, an order of driving the switching elements may be changed. For example, the order is set to be a descending order of the current values of the switching elements Q1 to Q4 of the arm A1. Alternatively, rankings of the current values are associated with driving turns beforehand, and the switching elements Q1 to Q4 are driven in an order of the driving turns corresponding to the rankings in the next cycle. For example, rankings 1, 2, 3, and 4 are associated with driving turns 4, 3, 2, and 1 beforehand. A switching element having a first rank in some cycle has a fourth driving turn in the next cycle. A switching element having a rank of 2 has a third driving turn in the next cycle. A switching element having a rank of 3 has a second driving turn in the next cycle. A switching element having a rank of 4 has a first driving turn in the next cycle. This distributes switching elements having large current values through cycles, so as to level the losses between the switching elements.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic circuitry configured to convert DC voltage specified by a difference between a first voltage and a second voltage into AC voltage and to supply the AC voltage to a first terminal and a second terminal between which a load circuit is to be connected, comprising:
   first switching circuitry coupled to the first voltage and the first terminal and configured to be turned on during at least part of a first period in a cycle and configured to be turned off during a second period in the cycle;
   second switching circuitry coupled to the second voltage and the second terminal and configured to be turned on during at least part of the first period in the cycle and configured to be turned off during the second period in the cycle;
   third switching circuitry coupled to the first voltage and the second terminal and configured to be turned off during the first period in the cycle and configured to be turned on during at least part of the second period in the cycle; and
   fourth switching circuitry coupled to the second voltage and the first terminal and configured to be turned off during the first period in the cycle and configured to be turned on during at least part of the second period in the cycle, wherein
   at least one of the first switching circuitry to the fourth switching circuitry includes a first switching element and a second switching element in parallel, and
   during a time period during which the at least one of the first switching circuitry to the fourth switching circuitry is turned on, the first switching element is turned on during a first subperiod, and the second switching element is turned on during a second subperiod, wherein the first subperiod and the second subperiod partially overlaps with each other.

2. The electronic circuitry according to claim 1, wherein in a first cycle, the first subperiod and the second subperiod are arranged in a first order, and
   in a second cycle, the first subperiod and the second subperiod are arranged in a second order that is different from the first order.

3. The electronic circuitry according to claim 1, wherein the first subperiod has a length that is different from a length of the second subperiod.

4. The electronic circuitry according to claim 1, comprising
   a plurality of current sensors configured to detect current values of the first switching element and the second switching element, wherein
   a length of the first subperiod and a length of the second subperiod are controlled based on the current values of the first switching element and the second switching element.

5. The electronic circuitry according to claim 1, comprising
   a plurality of current sensors configured to detect current values of the first switching element and the second switching element, wherein
   a time period during which the first subperiod overlaps the second subperiod is controlled based on at least one of the current values of the first switching element and the second switching element.

6. The electronic circuitry according to claim 1, comprising
   a plurality of current sensors configured to detect current values of the first switching element and the second switching element, wherein
   an order of the first subperiod and the second subperiod is controlled based on the current values of the first switching element and the second switching element.

7. The electronic circuitry according to claim 1, wherein an order of the first subperiod and the second subperiod is determined randomly.

8. The electronic circuitry according to claim 1, wherein the first switching element and the second switching element are MOS transistors.

9. The electronic circuitry according to claim 1, comprising a DC power supply including a positive power supply terminal that provides the first voltage and a negative power supply terminal that provides the second voltage.

10. An electronic circuitry that converts DC voltage specified by a difference between a first voltage and a second voltage into AC voltage and supplies the AC voltage to a first terminal and a second terminal between which a load circuit is to be connected, the electronic circuitry comprising:
    first switching circuitry coupled to the first voltage and the first terminal and configured to be turned on during at least part of a first period in a cycle and configured to be turned off during a second period in the cycle;
    second switching circuitry coupled to the second voltage and the second terminal and configured to be turned on during at least part of the first period in a cycle and configured to be turned off during the second period in the cycle;
    third switching circuitry coupled to the first voltage and the second terminal and configured to be turned off during the first period in the cycle and configured to be turned on during at least part of the second period in the cycle; and
    fourth switching circuitry coupled to the second voltage and the first terminal and configured to be turned off during the first period in the cycle and configured to be turned on during at least part of the second period in the cycle, wherein
    at least one of the first switching circuitry to the fourth switching circuitry includes a first switching element and a second switching element in parallel,
    in a first cycle, during a time period during which the at least one of the first switching circuitry to the fourth switching circuitry is turned on, the first switching element is turned on during a first subperiod, and the second switching element is turned on during a second subperiod that starts after the first subperiod, and in a second cycle, during a time period during which the at least one of the first switching circuitry to the fourth switching circuitry is turned on, the second switching element is turned on during a third subperiod, and the first switching element is turned on during a fourth subperiod that starts after the third subperiod.

11. An electronic circuitry that converts DC voltage into AC voltage and supplies the AC voltage to a first terminal and a second terminal between which a load circuit is to be connected, the electronic circuitry comprising:

first switching circuitry coupled to a first voltage and the first terminal and configured to be turned on during at least part of a first period in a cycle and configured to be turned off during a second period in the cycle;

second switching circuitry coupled to a second voltage and the second terminal and configured to be turned on during at least part of the first period in a cycle and configured to be turned off during the second period in the cycle;

third switching circuitry coupled to the first voltage and the second terminal and configured to be turned off during the first period in the cycle and configured to be turned on during at least part of the second period in the cycle; and fourth switching circuitry coupled to the second voltage and the first terminal and configured to be turned off during the first period in the cycle and configured to be turned on during at least part of the second period in the cycle, wherein at least one of the first switching circuitry to the fourth switching circuitry includes at least two switching elements, which are a first switching element and a second switching element in parallel, during a time period during which the at least one of the first switching circuitry to the fourth switching circuitry is turned on, the first switching element is turned on during a first subperiod, and the second switching element is turned on during a second subperiod, and a time period during which the second subperiod overlaps the first subperiod is controlled based on a current value of the second switching element.

* * * * *